(12) United States Patent
Breyvogel et al.

(10) Patent No.: US 8,919,854 B2
(45) Date of Patent: Dec. 30, 2014

(54) VARIABLE LIGHTWEIGHT SEAT CONCEPT

(71) Applicants: Volkswagen Aktiengesellschaft, Wolfsburg (DE); Sitech Sitztechnik GmbH, Wolfsburg (DE)

(72) Inventors: Joerg Breyvogel, Lehre (DE); Hans Rohlfing, Braunschweig (DE); Tobias Woynowski, Hannover (DE); Ole Stollreiter, Berlin (DE); Robert Sulowski, Jaczow (PL); Jaroslaw Szydlo, Polkowice (PL)

(73) Assignees: Volkswagen Aktiengesellschaft, Wolfsburg (DE); Sitech Sitztechnik GmbH, Wolfsburg (DE)

( * ) Notice: Subject to any disclaimer, the term of this patent is extended or adjusted under 35 U.S.C. 154(b) by 0 days.

(21) Appl. No.: 13/959,264

(22) Filed: Aug. 5, 2013

(65) Prior Publication Data

US 2014/0008950 A1 Jan. 9, 2014

Related U.S. Application Data

(63) Continuation of application No. PCT/EP2012/000197, filed on Jan. 18, 2012.

(30) Foreign Application Priority Data

Feb. 5, 2011 (DE) .......................... 10 2011 010 387

(51) Int. Cl.
*B60N 2/01* (2006.01)
*B60N 2/30* (2006.01)
*B60N 2/24* (2006.01)
*B60N 2/005* (2006.01)

(52) U.S. Cl.
CPC ................ *B60N 2/01* (2013.01); *B60N 2205/35* (2013.01); *B60N 2/3097* (2013.01); *B60N 2/242* (2013.01); *B60N 2/3011* (2013.01); *B60N 2/305* (2013.01); *B60N 2/005* (2013.01)
USPC ..................... 296/65.03; 296/65.01; 297/233; 297/248; 297/257

(58) Field of Classification Search
CPC ........................................................ B60N 2/01
USPC ............ 296/65.01, 65.03; 297/232, 233, 248, 297/257
See application file for complete search history.

(56) References Cited

U.S. PATENT DOCUMENTS 5,769,360 A 6/1998 Kerbis et al.
7,578,551 B2 * 8/2009 Linero .......................... 297/107
(Continued)

FOREIGN PATENT DOCUMENTS

DE 428 522 C 5/1926
DE 1 011 744 B 7/1957
(Continued)

*Primary Examiner* — Lori Lyjak
(74) *Attorney, Agent, or Firm* — Muncy, Geissler, Olds & Lowe, P.C.

(57) ABSTRACT

A bench for a vehicle is provided, which bench comprises at least two seats that are arranged next to one another and are connected to one another. Provision is made for one of the at least two seats to act as a base seat that has at least one locking unit for the purpose of connection to a vehicle floor of a vehicle body, while the at least one other seat hovers above a vehicle floor since the other seat is reversibly connected solely to the base seat.

19 Claims, 27 Drawing Sheets

(56) References Cited

U.S. PATENT DOCUMENTS

| | | | |
|---|---|---|---|
| 7,594,701 B2 * | 9/2009 | Kawabata et al. | 297/452.63 |
| 7,837,146 B2 * | 11/2010 | Bauer | 244/118.6 |
| 7,845,725 B1 * | 12/2010 | Sawhney | 297/248 |
| 7,857,259 B2 | 12/2010 | Baatz et al. | |
| 8,393,677 B2 | 3/2013 | Wieclawski | |
| 2010/0084899 A1 | 4/2010 | Wieclawski | |

FOREIGN PATENT DOCUMENTS

| | | |
|---|---|---|
| DE | 1 124 834 B | 3/1962 |
| DE | 42 39 141 A1 | 5/1993 |
| DE | 10 2005 042 403 B3 | 5/2007 |
| DE | 10 2008 029 261 A1 | 12/2009 |
| DE | 10 2008 050 301 A1 | 4/2010 |
| JP | S56-71638 A | 6/1981 |
| JP | 2008-284901 A | 11/2008 |

* cited by examiner

VARIABLE LIGHTWEIGHT SEAT CONCEPT

This nonprovisional application is a continuation of International Application No. PCT/EP2012/000197, which was filed on Jan. 18, 2012, and which claims priority to German Patent Application No. 10 2011 010 387.2, which was filed in Germany on Feb. 5, 2011, and which are both herein incorporated by reference.

BACKGROUND OF THE INVENTION

1. Field of the Invention

The present invention relates to a seat bench which enables a variable seat arrangement in a vehicle.

2. Description of the Background Art

Variable seat concepts with a predetermined seat arrangement are known from the prior art; these allow a number of seat combinations in terms of the number of passengers or the use of the seats.

In some seat concepts, the main focus in terms of variability is that the trunk compartment conditions can be flexibly adjusted.

In other known seat concepts, the main focus is to be able to transport as many people as possible. Thus, in a known seat concept in the maximum variant there is room for up to eight passengers plus the driver in a vehicle: in each case, three passengers in the two three-seat rows of the second and third row of seats in the rear and two persons in the optional front passenger two-seat bench and the driver in a single seat. The second row of seats behind the driver or the front passenger two-seat bench or the front passenger single seat has, for example, a foldable two-seat bench with backrest adjustment plus a single seat with an "easy entry" folding mechanism for easier side entry. In comfort versions, all single and double seats can be folded down, folded flat, and removed.

In all known seat concepts, the focus is always on two viewpoints for reasons of comfort. On the one hand, it must be assured that the weight of the single and/or double seats is not too great particularly for removal and installation or for the so-called rolling up of the vehicle seat or the folding down of the backrest. In practice, even the single seats are usually so heavy that they can be removed or rolled up only by strong individuals. On the other hand, the unlocking and locking of the single and/or double seats for their removal and installation or for rolling up the vehicle seat or for folding down of the backrest must be easily achieved and actuated. The removal and installation, the rolling up of the car seat, or the folding down of the backrest should be rapidly executable, whereby the body-side connection of the single and/or double seats must be so secure, however, that they remain secure in a crash and moreover it is assured that the crash forces are safely conducted away into the body of the vehicle.

A seat unit with two or more passenger seats, which have rapid-release fastening devices, by means of which a common base device can be connected to a passenger seat or a plurality of passenger seats, is known from DE 42 39 141 A1. The passenger seats in the known approach, however, are not optimally designed in terms of their weight.

SUMMARY OF THE INVENTION

It is therefore an object of the present invention to provide a variable seat concept, which allows variable seat combinations and in addition can be handled comfortably and rapidly.

In an embodiment a seat bench for a vehicle is provided, which bench comprises at least two seats, which are arranged next to one another and are connected to one another.

It is provided that one of the at least two seats acts as a base seat, which has at least one locking unit for connection to a vehicle floor of a vehicle body, whereas the at least one other seat (side seat) floats above a vehicle floor, because the other seat (side seat) is reversibly connected solely to the base seat.

In an embodiment of the invention, the base seat is always the middle seat and the at least one other seat is a side seat, which is arranged to the left and right or to the right and left of the middle base seat.

In an embodiment of the invention, it is provided that to form a two-seat bench a side seat is arranged beside the middle base seat and to form a three-seat bench two side seats are arranged, said seats being connected in a floating manner to the middle base seat.

An object that a change in the seat arrangement is possible variably, whereby primarily the weight of the side seat is reduced by the reduced understructure, is attained by the floating arrangement of the side seats. To assure rapid and comfortable handling during the installation and removal of the side seats, advantageous simple fastening variants for connecting the side seats with the middle base seat have been created.

In a first fastening variant, the connection between the base seat and the at least one side seat occurs in that the base seat has at least one receiving element in which an adapter plate of the at least one side seat can be fastened.

In a second fastening variant, the connection between the base seat and the at least one side seat occurs in that the base seat has a joint arrangement to which at least one frame of the at least one side seat can be fastened.

In a third simplified fastening variant, it is ensured in a basic version that the connection between the base seat with the at least one side seat occurs in that a screw-type module is arranged between the base seat and the at least one side seat.

In an embodiment of the invention, to increase the variability the possibility is created to change a two-seat or a three-seat bench into a rolled-up position, whereby in a starting position the seat benches are connected via four attachment points with a vehicle floor of a vehicle body and during the rolling-up process, which is described extensively in the description part, are connected to the vehicle floor only via two attachment points.

In an embodiment of the invention, to increase the variability further, the possibility is created that the side seats, particularly the seat bench of the second row of seats, can be changed into an easy-entry folded position, which is described extensively in the description section.

The design of the seat bench and the variable options are combined with the idea that both the side seats and the middle base seat are produced in a lightweight manner. The side seats in particular, which are installed and removed more often in practice, are produced almost entirely from a lightweight material. It is also provided, however, to produce the base seat from a lightweight material, whereby some components of the seat structure are produced from a steel material, to assure that crash forces, acting on the base seat and the side seat in a crash, are absorbed and can be conducted to the vehicle body. The lightweight concept is also explained in greater detail in the description section.

Such a seat bench is arranged on a vehicle body of a vehicle, in which the vehicle body according to the invention has a maximum of four body-side attachment points for connecting the seat bench with up to three seat places in a row of seats, whereby the reversible connection of the seat bench to the vehicle floor is assured via the attachment points together with the locking units of a base seat of the seat bench. The seat arrangement is characterized particularly in that at least one side seat, which is arranged at the middle base seat, floats above the vehicle floor of the vehicle.

The vehicle of the invention is characterized in that the vehicle floor of the vehicle body has only four attachment points for mounting a two-seat or a three-seat bench in a row of seats.

If two seat benches (two-seat or three-seat) are arranged in two rows of seats, the vehicle has only eight attachment points.

It therefore applies in general depending on the number n of the rows of seats n=1, n=2 for a first or a first and a second row of seats that the number of attachment points is in each case four times the number of rows of seats, whereby a row of seats comprises at least one base seat and one other seat (left or right) or two other seats (left and right).

Finally, in a further embodiment it is proposed that the four feet of a seat bench of a row of seats can be fastened slidably via a rail system, which preferably is provided in the lengthwise direction of the vehicle on the vehicle floor. The attachment points in this embodiment are not arranged unchangeable on the vehicle floor, but it is possible in an advantageous manner to move the seat bench flexibly within the vehicle relative to the body, further to the front or further to the back in the vehicle, on the rails of the rail system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 3-1 to 3-6 illustrate a perspective view of the vehicle interior to illustrate an installation sequence of a three-seat bench in a second row of seats;

FIGS. 3-7 to 3-11 are a perspective view of the vehicle interior obliquely from the back to illustrate an installation sequence of a three-seat bench in a third row of seats;

FIG. 3-12 is a left and right illustration a seat arrangeable at a base seat on the right, whereby the seat in the left illustration is shown from the back and the seat in the right illustration from below.

FIG. 3-13 is a view of the vehicle interior in the area of the second row of seats;

FIG. 3-14 is a view of the vehicle interior in the area of the third row of seats;

FIGS. 4-1 to 4-4 are a perspective illustration of the second and the third row of seats with different possible single-table functions;

FIG. 5 is a perspective illustration of a rolled-up position in the example of the third row of seats;

FIGS. 6-1 and 6-2 are perspective views of the vehicle interior from the right and left with an easy-entry folded position of a particular side seat in the second row of seats;

FIGS. 7-1 to 7-3 are perspective views of the vehicle interior from its back to illustrate a changeability of the interior to create additional storage space;

FIG. 8 is a seat bench of the second or third row of seats with integrated ISOFIX connectors and top-tether connectors;

FIGS. 9-1 and 9-2 are a seat bench (FIG. 9-1) and a single vehicle seat (FIG. 9-2) with the illustration of the material concept;

FIGS. 10-1 to 10-7 are a technical solution for realizing an easy-entry folded position and the removal solution for freely floating side seats relative to the base seats;

FIGS. 11-1 to 11-3 are a further technical solution for realizing an easy-entry folded position and a further removal solution for freely floating side seats relative the base seats;

FIGS. 12 and 13 are a basic version of a seat bench in a second or third row of seats;

FIG. 14 is an alternative seat concept of a seat bench in a second or third row of seats.

DETAILED DESCRIPTION

Figure 1:
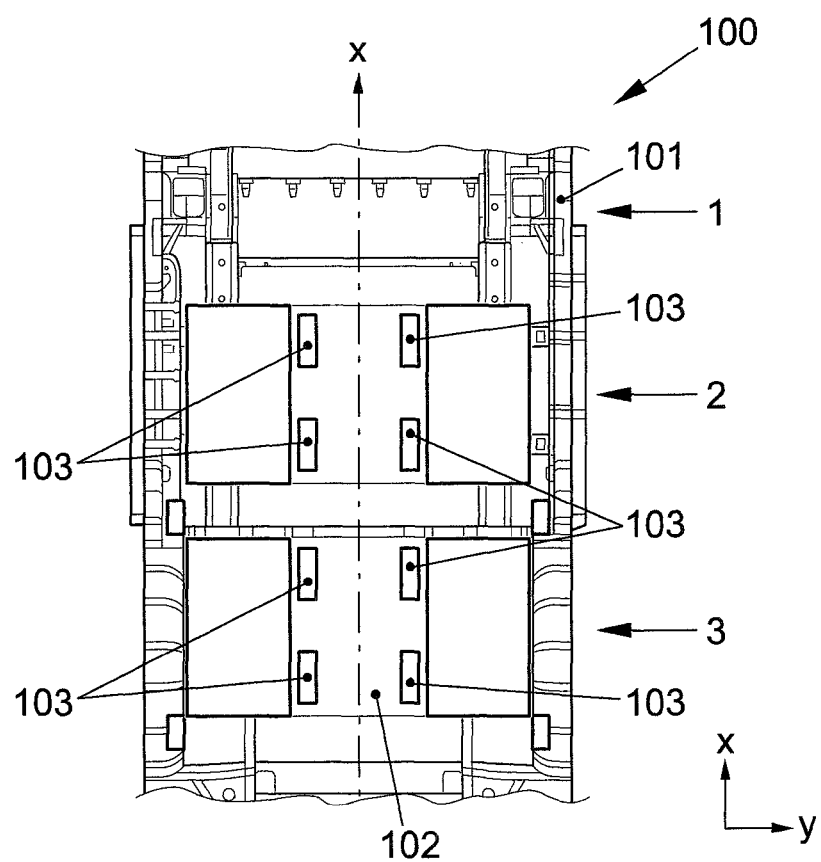
FIG. 1 illustrates a section in the area of a vehicle floor of a vehicle body of a vehicle in a view from above.

The arrangement of a vehicle seat within a motor vehicle and its usual direction of travel determine the following direction information. In or opposite to the direction of travel corresponds to the x-direction, and the vertical in a vehicle is established with the z-direction, whereby the axes transverse to the direction of travel run in the y-direction.

Further, the sides of a vehicle 100 which lie in the normal direction of travel x are designated as the left and right side. A seat bench S in the usual installation state relative to a longitudinal direction of the vehicle in x-direction lies transverse to the longitudinal direction x in the y-direction.

In the following description of the figures, the same reference characters are always used for the same components and parts, whereby reference characters repeating in the figures are sometimes not repeated.

FIG. 1 shows a section in the area of a vehicle floor 102 of a vehicle body 101 of a vehicle 100 in a view from above. Vehicle 100 has a first row of seats 1, a second row of seats 2, and a third row of seats 3. The first row of seats 1 is not shown in greater detail. For example, a single vehicle seat for the driver and a single vehicle seat for the front passenger are arranged in the first row of seats 1. It is also possible to arrange a single vehicle seat for the driver and two front passenger seats as a double seat bench S in the first row of seats 1. Finally, a three-seat bench S for the driver and two front passengers can also be arranged in the first row of seats 1. In this case, the arrangement of a typical three-seat bench or a seat bench S is possible, as this is used according to the invention in the second and third row of seats 2, 3 in a vehicle 100. The seat benches S of the invention are described in greater detail in the following figures. The section in the area of vehicle floor 102 shows that the second and third row of seats 2, 3 are each assigned only four attachment points 103. Said attachment points 103 are located in or on vehicle floor 102 and in regard to a central axis, running in the longitudinal direction x, of vehicle 100 are arranged symmetrically to the left and right of said central axis. As FIG. 1 already shows, the second row of seats 2 is equipped with an easy-entry function, whereby the easy-entry function and the function of the third row of seats will still be described in greater detail below.

Figure 2:
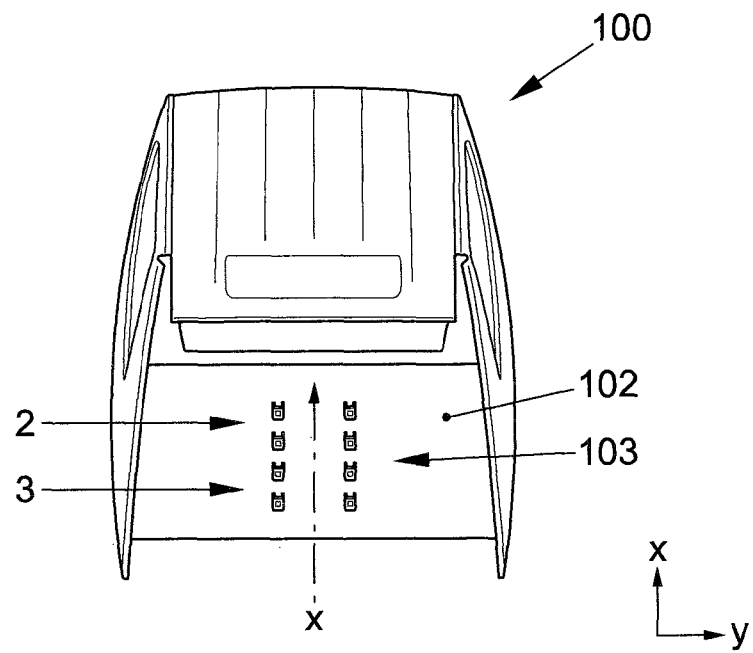
FIG. 2 is a perspective view of a vehicle interior.

FIG. 2 shows, in a perspective view of an interior of vehicle 100, vehicle floor 102 and attachment points 103 for the second and third row of seats 2, 3, which in regard to the central axis, running in the longitudinal direction, of vehicle 100 are arranged symmetrically to the left and right of said central axis.

FIGS. 3-1 to 3-6 each show a perspective view of the interior of vehicle 100 obliquely from the front to illustrate an installation sequence of a three-seat bench S in a second row of seats 2.

The explanation of the installation sequence in a first embodiment variant is based on a vehicle body 101, which has a left side door 104L and a right side door 104R.

Figures 1, 3:
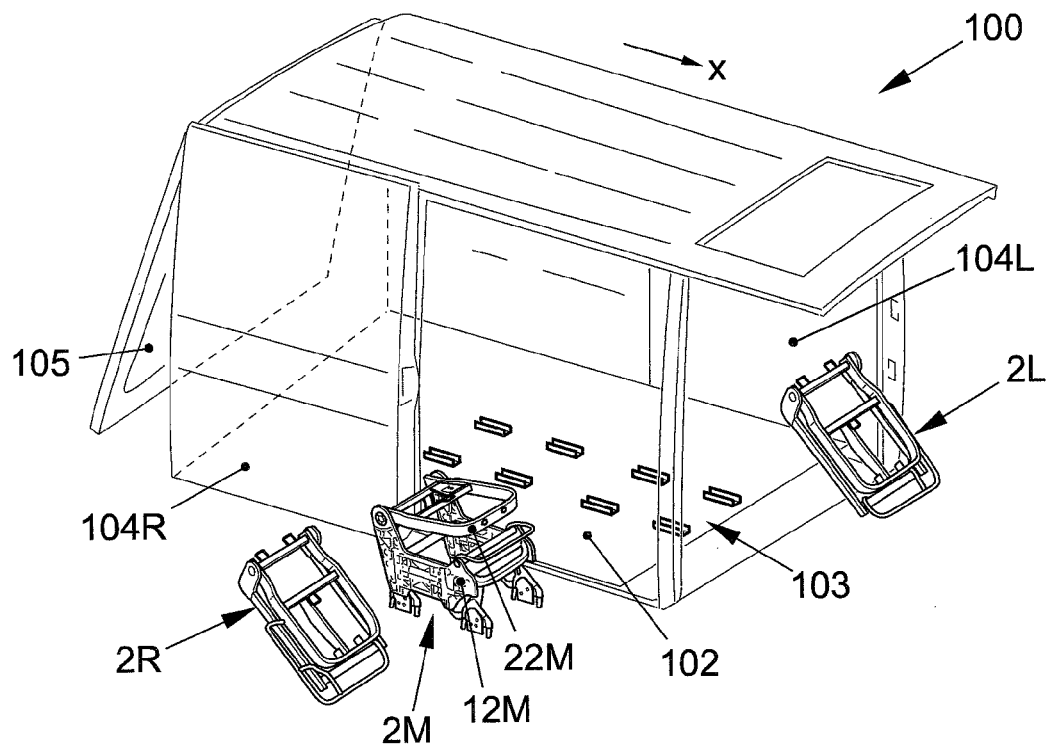
Figures 2, 3:
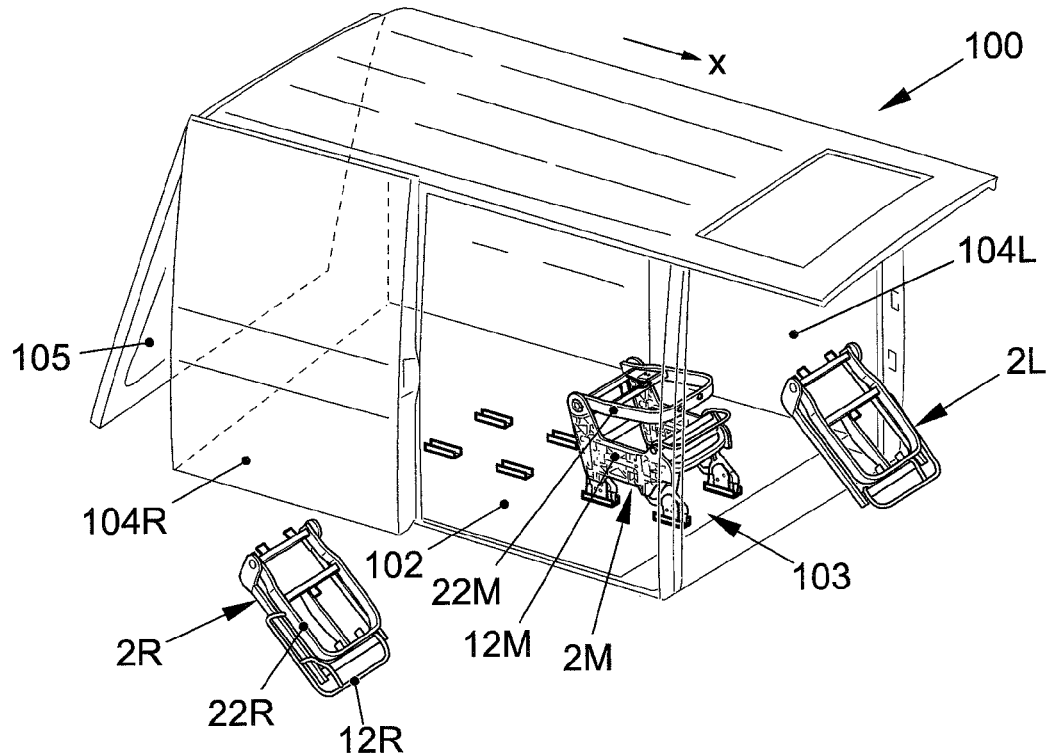
Figure 3:
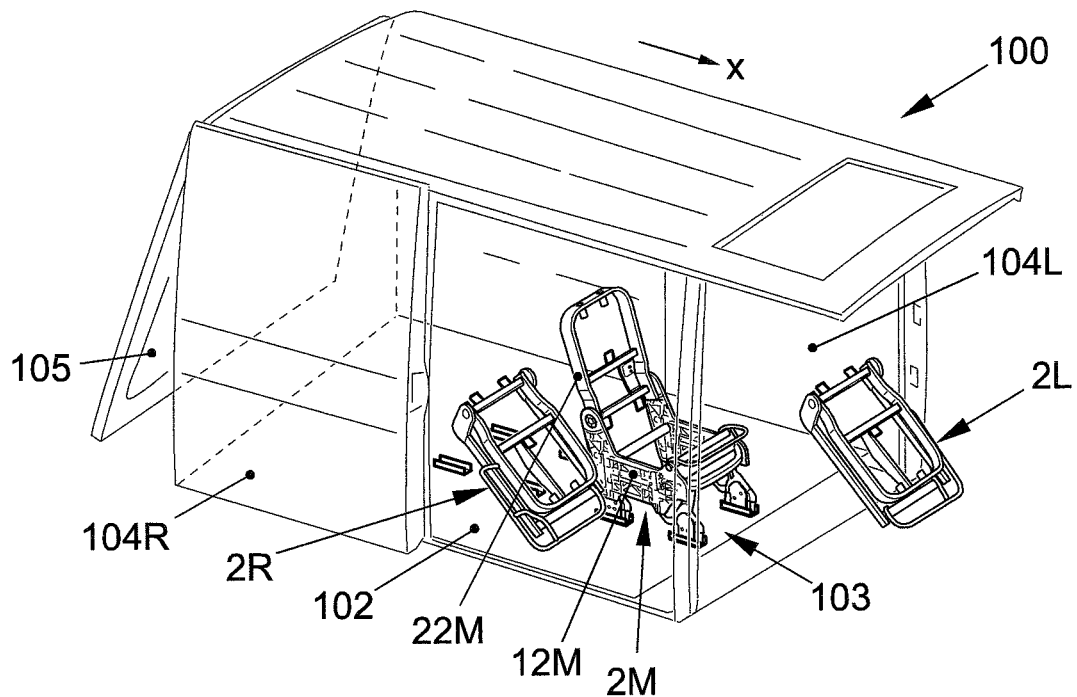

The three-seat bench S comprises a middle base seat 2M and a left seat 2L and a right seat 2R. According to FIG. 3-1, middle base seat 2M is first brought into the interior of vehicle 100, whereby backrest 22M is preferably folded down on seat part 12M. According to FIG. 3-2, middle base seat 20M is placed on the four attachment points 103. The design of the connection between body-side attachment points 103 and middle base seat 2M will be discussed in greater detail below. After middle base seat 2M has been placed, backrest 22M of middle base seat 2M can be folded up. This situation is shown in FIG. 3-3, whereby it is also shown how right seat 2R is brought into the interior of vehicle 100 via right side door 104R. In so doing, backrest 22R is folded onto seat part 12R. According to FIG. 3-4, right seat 2R is attached laterally to base seat 2M. According to FIG. 3-5, backrest 22R can then be already folded up, whereby the figure also shows how left seat 2L is brought into the interior of vehicle 100 via left side door 104L. In the case of left seat 2L as well, when left seat 2L is brought into the interior of vehicle 100, backrest 22L is still folded onto seat part 12L. According to FIG. 3-6, left seat 2L is also attached laterally to middle base seat 2M and then backrest 22L is folded up. It is clear in FIG. 3-6 that side seats 2L and 2R are arranged freely floating above vehicle floor 102. If only a two-seat bench S is to be installed, the installation of left or right seat 2L, 2R can be omitted.

FIGS. 3-7 to 3-11 each show a perspective view of the interior of vehicle 100 to illustrate an installation sequence of a three-seat bench S in a third row of seats 3.

Vehicle 100 has a back door 105 through which the third row of seats 3 is installed. The three-seat bench S comprises a middle base seat 3M and a left seat 3L and a right seat 3R. According to FIG. 3-7, middle base seat 3M is first brought into the interior of vehicle 100 via a back door 105, whereby middle base seat 3M is first installed on the front two attachment points 103 of the four attachment points for the third row of seats 3. Backrest 23M of middle base seat 3M for this purpose is still folded down on seat part 13M particularly when the second row of seats 2 has already been installed. According to FIG. 3-8, middle base seat 3M is pivoted down, so that the connection between the four body-side attachment points 103 and middle base seat 3M is created, whereby the details of the design of the connection will be discussed in greater detail below.

After middle base seat 3M has been placed, backrest 23M of middle base seat 3M can be folded up. This situation is shown in FIG. 3-10, whereby it is also shown how left seat 3L is brought into the interior of vehicle 100. In this case, backrest 23L is folded onto seat part 13L. Left seat 3L is fastened laterally to base seat 3M. As FIG. 3-10 and FIG. 3-11 show, backrest 23L can then be folded up, whereby right seat 3R of the third row of seats 3 is mounted analogously to middle seat 3M. It becomes clear particularly in FIG. 3-11 that side seats 3L and 3R are disposed floating freely above vehicle floor 102. It is understood that a two-seat bench S can be built into the third row of seats in that the installation of the left or right seat 3L, 3R is omitted.

FIG. 3-12 shows in a left and a right illustration a seat 2R, 3R arrangeable to the right on a base seat 2M, 3M of a second or a third row of seats 2, 3, whereby seat 2R, 3R is shown from the back in the left illustration and seat 2R, 3R is shown from below in the right illustration. It is understood that the illustrated seat 2R, 3R arrangeable to the right can also be designed so that it is arranged at a base seat 2M, 3M to the left.

A cross tube Q, which has an adapter plate A at one end, is connected to seat part 12R, 13R. The version with adapter plate A represents a first possible fastening variant. A second fastening variant is presented in FIGS. 11-1 to 11-3. As FIG. 3-12 in the left illustration shows, seats 2R, 3R are constructed so that they can be placed on adapter plate A and a fitting B between seat part 12R, 13R and backrest 22R, 23R of the seat. For this purpose, spacer elements made of plastic or rubber can be provided to avoid damaging the structure or chassis parts. The particular seat part 12R, 13R is formed on the side of adapter plate A so that it does not form a projection relative to the particular backrest 22R, 23R, so that a laterally flat and secure placement of seat 2R, 3R, in which seat 2R, 3R lies securely and stably on its side, on a vehicle floor 102 is possible, as shown in FIG. 3-12. In addition, the construction ensures that the center of gravity, which is shown in both figures by a dot, in spatial terms, is formed centrally within seat 2R, 3R. This central center of gravity is particularly important for handling during installation and removal of a side seat 2R, 3R or 2L, 3L, because the handling is made easier with a central center of gravity. According to the invention, it is also ensured that base seat 2M, 3M, precisely like side seats 2R, 3R, 2L, 3L, also has a central center of gravity, in spatial terms, lying within the structure of seat 2M, 3M.

The possibility of being able to put a side seat 2R, 3R, 2L, 3L in the interim laterally and flat on a vehicle floor 102, is of particular advantage, as the following explanation for FIGS. 3-13 and 3-14 will make clear.

FIG. 3-13 shows the interior of vehicle 100 in a plan view in the area of the second row of seats 2.

FIG. 3-13 explains based on the removal sequence in a second embodiment variant, how the removal and installation of seats 2R, 2M, 2L occurs when vehicle body 101 has, for example, only one right side door 104R. Right side door 104R is shown on the left in FIG. 3-13.

In a first step a), right seat 2R is separated from base seat 2M and taken out of the interior of vehicle 100. In this case, backrest 22R can remain in the sitting position or be folded onto seat part 12R, before right seat 2R is removed.

In a second step b), backrest 22L of left seat 2L is folded onto seat part 12L. Next, left seat 2L is separated from base seat 2M and pivoted by 90°, so that the flat side of adapter plate A and fitting B, which were previously arranged to the side of base seat 2M, lie on vehicle floor 102. This procedure can be easily performed, because side seat 2L or side seats 2L, 2R have no understructure and the structure is reduced to the basics, so that the side seats have a low weight overall. As will be explained still further below, the side seats are made of a lightweight material except for some parts, such as, e.g., adapter plate A, so that easy handling for the user is assured.

In a third step c), base seat 2M is unlocked and removed, whereby backrest 22M can remain in the sitting position or be folded onto seat part 12M, before base seat 2M is taken out of the interior of vehicle 100.

In a fourth step d), finally the already folded left seat 2L is taken out via right side door 14 R.

It is understood that the installation is made in the reverse sequence; in other words, left seat 2L is first placed in the folded state on vehicle floor of 102 across from the right side door 104R, after which base seat 2M is installed. Next, left seat 2L can be connected to base seat 2M, after which finally right seat 2R is brought into the interior and connected to base seat 2M.

For easier handling, a handle for carrying seat 2L, 3L, 2R, 3R, rotated by 90°, can be provided on side seat 2L, 3L, 2R, 3R.

FIG. 3-14 shows the interior of vehicle 100 in a plan view in the area of the second row of seats 2.

FIG. 3-14 explains based on the removal sequence how the removal and installation of seats 3R, 3M, 3L occurs via back door 105.

In a first step a), backrest 23R of right seat 3R is folded onto seat part 13R. Next, right seat 3R is separated from base seat 3M and pivoted by 90°, so that the flat side of adapter plate A and fitting B, which were previously disposed to the side of base seat 3M, lie on the vehicle floor. Of course, the process can also be started with left seat 3L. Because right seat 3R lies folded onto its side with the saving of space, it can be easily taken out from the interior of vehicle 100 via trunk lid 105 in the gap between lateral vehicle body 101 and the lateral boundary of base seat 3M.

In a second step b), the process is analogous for left seat 3L.

Finally, in a third step c), seat 3M is unlocked and removed, whereby backrest 23M can remain in the sitting position or can be folded onto seat part 13M, before base seat 3M is taken out of the interior of vehicle 100.

The installation occurs in the reverse sequence; in other words, base seat 3M is installed first. Next, the left or right seat 3L, 3R is lifted in and fastened to base seat 3M, whereby left and right seat 3L, 3R for fastening to base seat 3M can be placed in the interim laterally on adapter plate A and fitting B.

Figures 3, 4:
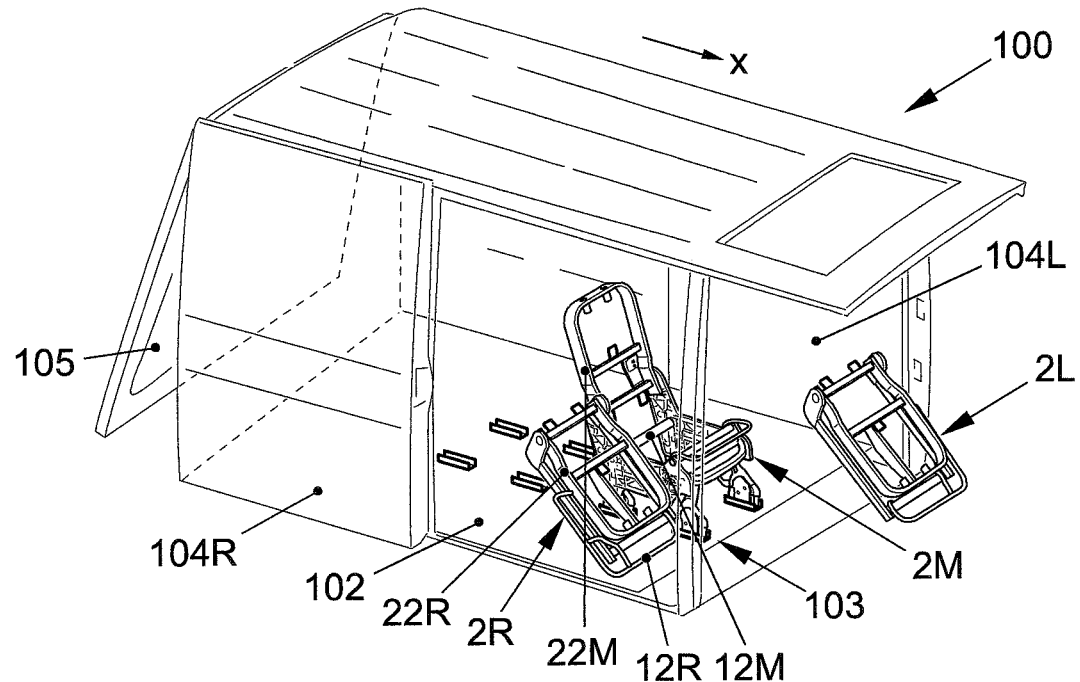

FIGS. 4-1 to 4-4 show in perspective illustrations different options for producing table trays, which are formed by the back of the respective backrest of the seats.

For example, according to FIG. 4-1, a table is formed both in the second row of seats 2 and in the third row of seats 3 by folding backrest 22L, 23L on the left side of vehicle 100.

FIG. 4-2 shows the analogous arrangement on the right side of vehicle 100.

In an alternative embodiment in which a fitting is provided for each backrest, the middle backrests can also be folded down individually to form a table.

FIG. 4-3 shows the seat arrangement in which a table tray is formed in each case by the back of backrests 22L, 22R, 23L, 23R to the left and right of base seat 2M, 3M.

Finally, FIG. 4-4 shows a table-like surface, formed by the backs of all backrests of the seats in the second and third row of seats 2, 3. As a result, a large tray-like surface results with increased storage space for placing items in the interior of vehicle 100. The items can be brought into the interior via back door 105 (not shown) or also via at least one side door 104L, 104R (not shown).

Figures 3, 4, 5:
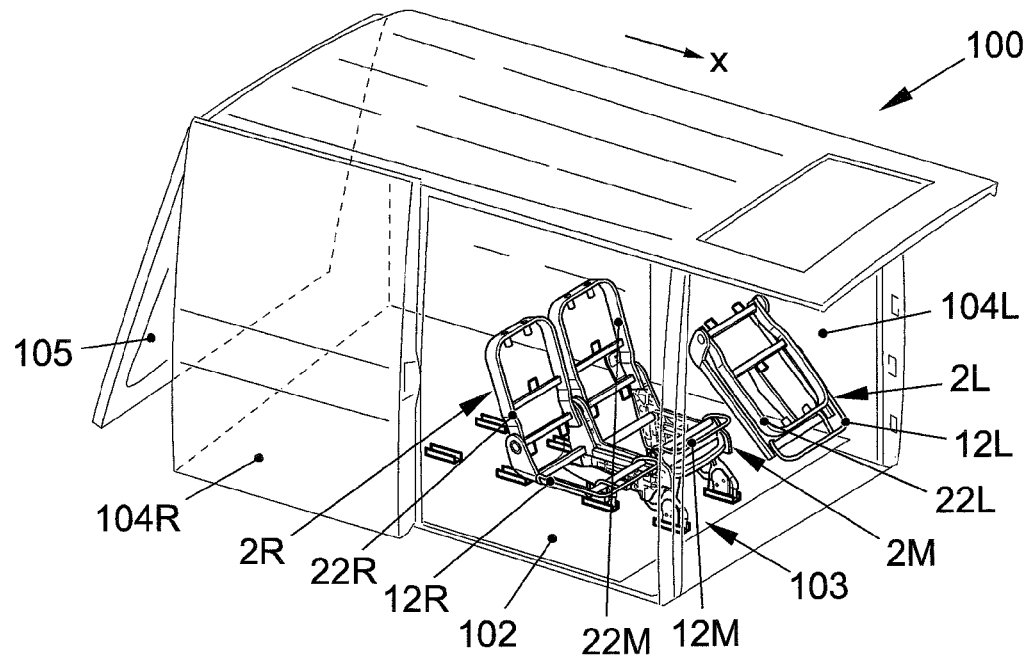

FIG. 5 shows with the example of the third row of seats 3 that the third row of seats 3 can be changed as a whole from a position for use as seats to a rolled-up position I. For this purpose, first backrests 23L, 23M, 23R are folded onto seat parts 13L, 13M, 13R. Next, the rolled-up position I of the third row of seats can be easily produced, because for rolling up the entire seat bench S only unlocking of back seat feet 53M of base seat 3M is necessary, in order to be able to pivot seat bench S over the front seat feet 53M of base seat 3M. The seat feet remain firmly anchored in vehicle floor 102. The pivoting movement is possible, because seat part 13M of base seat 3M is hinged pivotably relative to front seat feet 53M. This advantage is due to the low number of attachment points 103 of a seat bench S on vehicle floor 102. The freely floating seats 3L, 3R relative to vehicle floor 102 need not be unlocked separately from vehicle floor 102 for rolling up seat bench S.

Figures 3, 4, 5, 6:
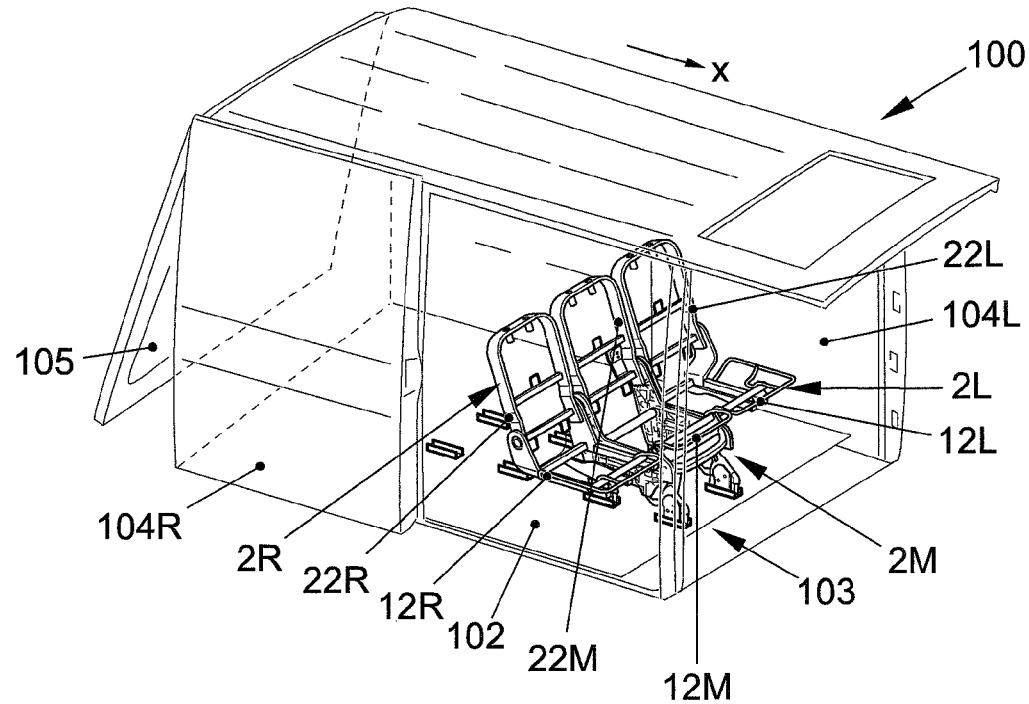

FIGS. 6-1 and 6-2 each show a perspective view from the right and left into the interior of vehicle 100 with an easy-entry folded position II of a particular side seat 2R, 2L of the second row of seats 2. Said easy-entry folded position II, in which the particular side seat 2R, 2L with folding of backrest 22R, 22L onto seat part 12R, 12L is brought into a forward pivoted position, makes possible easier access to the third row of seats 3 for a passenger. Easy-entry folded positions II are known per se. The associated detailed technical solution for carrying out the easy-entry folded position II is described in detail in FIGS. 10-1 to 10-6.

Figures 3, 4, 5, 6, 7:
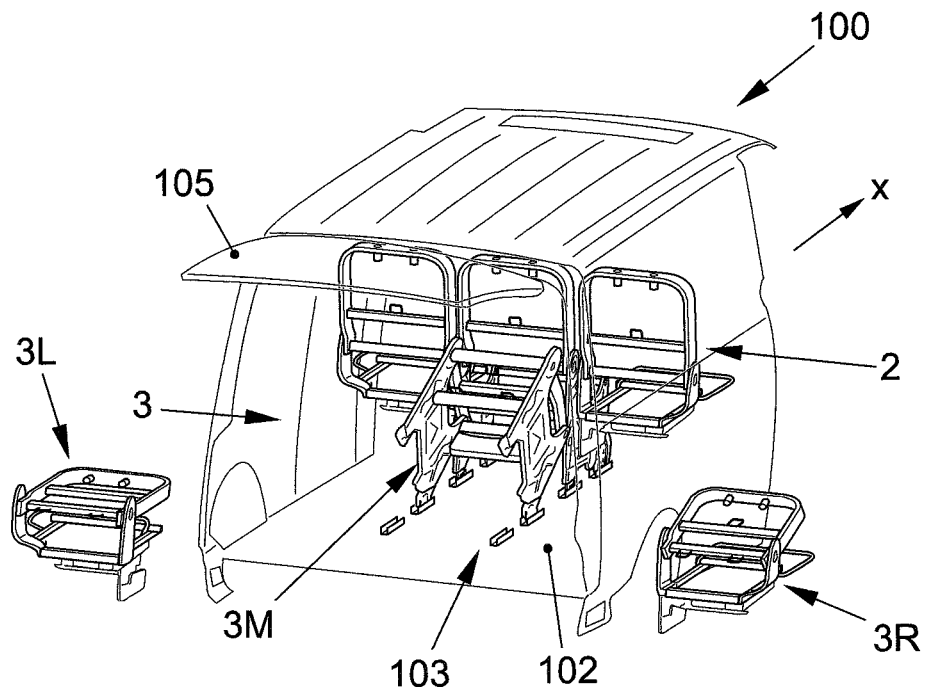

FIGS. 7-1 to 7-3 show in perspective views the interior of the vehicle from its back to illustrate the changeability of the interior to create additional storage space.

In order to be able to bring, for example, an item about W/H/D 300×1300×2000 mm in size into the interior of vehicle 100, as in FIG. 7-1, left seat 3L of the back row of seats 3 is removed via trunk lid 105. Next, as FIG. 7-2 shows, left seat 2L of the second row of seats 2 is removed. The particular advantage is that side seats 2L, 3L are not connected to the vehicle body, so that the storage surface for an item is free of any fixtures or fittings. The side seats must be separated from base seat 2M, 3M by the simply retained unlocking devices and because they are produced in addition in a lightweight manner they can be removed simply and easily by a person. FIG. 7-3 shows how transport item 106 is accommodated in the interior of vehicle 100. Additional storage space can also be created in the right area of the interior in the described manner. The entire interior can be used as storage space by removing base seats 2M, 3M.

Figures 3, 4, 5, 6, 7, 8:
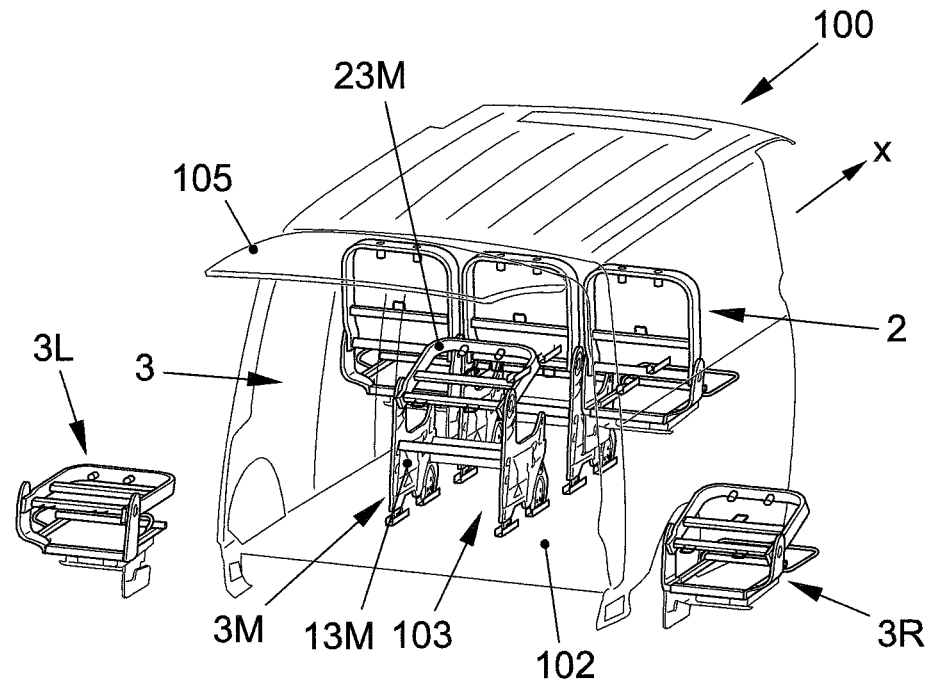

FIG. 8 shows that in seats 2L, 2M, 2R and 3L, 3M, 3R of a seat bench S of the second and/or third row of seats 2, 3, ISOFIX connectors 107 for child safety seats are integrated with a lower connector and further top-tether connectors 108 for child safety seats with a lower connector via ISOFIX connectors 107 and with an additional top connector by means of a safety strap.

In the following figures additional technical details are explained for the seat concept in association with the previously presented concept.

Figures 3, 4, 5, 6, 7, 8, 9:
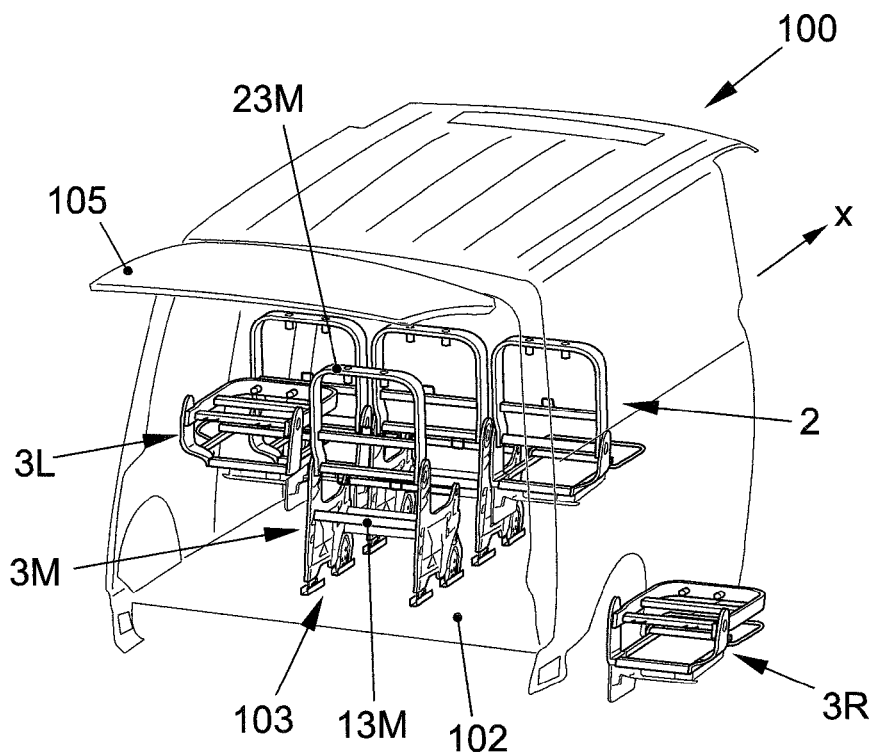

The lightweight concept for a seat bench S and particularly that for a base seat 2M, 3M are illustrated in FIGS. 9-1 and 9-2.

As FIG. 9-1 shows, it is proposed in an embodiment to produce seat feet 52M, 53M and the structure of seat part 12M, 13M as a whole from a steel material. It is provided in this case to provide the structure of seat part 12M, 13M in the back area with fitting parts 32M, 33M, which leads off substantially at right angles proceeding from seat part 12M, 13M in the direction of a backrest 22M, 23M in the sitting position. Backrest 22M, 23M of base seat 3M is made of a lightweight material, whereby inserts as fitting parts 42M, 43M on the backrest side made of steel material are integrated into the lightweight material of backrest 22M, 23M in the area of fitting parts 32M, 33M on the seat part side.

In addition, backrest connectors 62M, 63M, integrated into backrest 22M, 23M of base seat 2M, 3M, are also made of a steel material and connected to backrest 22M, 23M. In particular the side structure parts of seat part 12M, 13M of base seat 2M, 3M are produced from a steel material, because they must absorb the dead weight of side seats 2R, 3R or 2L, 3L and in addition in case of a crash the crash forces arising in base seat 2M, 3M itself and in side seats 2R, 3R or 2L, 3L and introduced into base seat 2M, 3M. Side seats 2R, 3R or 2L, 3L are also produced from a lightweight material, whereby the seat part-side understructure comprises components made of a steel material, so that a stable connection to base seat 2M, 3M is assured. In particular, the fastening to base seat 2M, 3M occurs via steel parts, which will be described in still greater detail below with reference to the figures. The seat part-side understructure of side seats 2R, 3R or 2L, 3L made of steel material is not visible in FIG. 9-1.

As FIG. 9-2 shows, it is proposed in a second embodiment to produce seat part 12M, 13M of base seat 2M, 3M from a lightweight material and at exposed sites where especially high forces are introduced into the seat part structure, to integrate inserts made of a steel material into the seat part structure made of a lightweight material. In the left illustration of FIG. 9-2, a single base seat 2M, 3M is shown which is produced substantially from a lightweight material. The fitting part 42M, 43M on the backrest side is integrated into backrest 22M, 23M otherwise made of a lightweight material. In the particular side part (shown as transparent) of seat part 12M, 13M (see illustration at bottom right), a fitting 32M, 33M on the seat-part side is integrated as an insert made of steel material in the side part otherwise produced from the lightweight material. Further, a frame-like reinforcement structure 72M, 73M is molded laterally in the lightweight material, whereby receiving elements 72-1M, 73-1M project on both sides from the lightweight material of the side parts and function to accommodate side seats 2L, 3L or 2R, 3R. Finally, another insert is arranged in the front area and optionally in addition also in the back area (not visible) of the particular side part, which in each case form a seat foot 52M, 53M, projecting from the lightweight material, of base seat 2M, 3M. In the illustration at the top right, the side part is not shown as transparent, so that only projecting receiving elements 72-1M, 73-1M and projecting seat feet 52M, 53M are visible. The illustrated receiving elements 72-1M, 73-1M are used to receive the already mentioned adapter plate A, which will be dealt with in greater detail below.

Figures 3, 4, 5, 6, 7, 8, 9, 10:
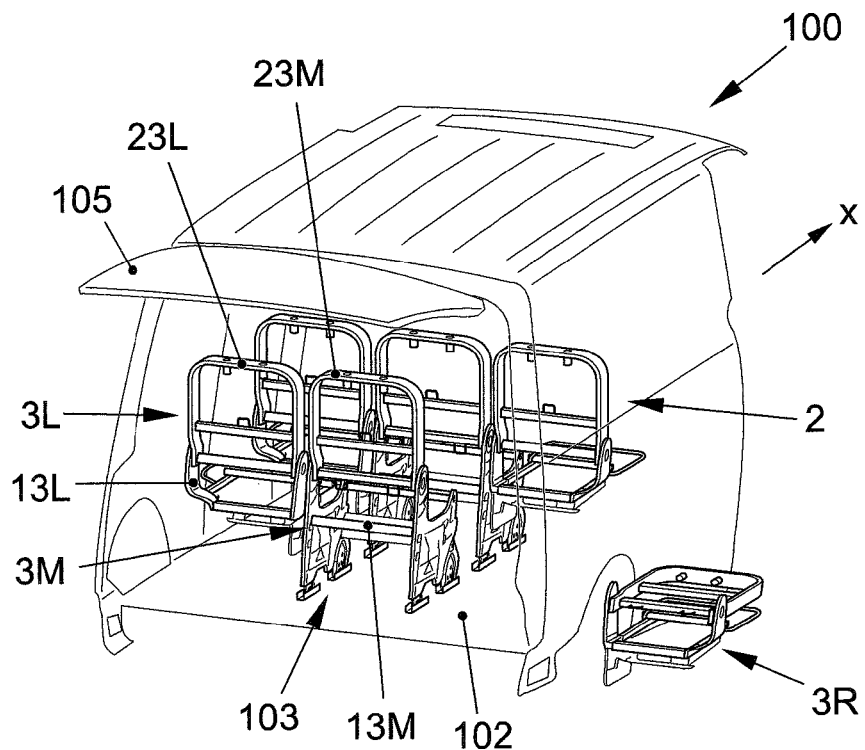

FIGS. 10-1 to 10-6 show a technical solution for realizing the easy-entry folded position II of the decoupling or removal of the freely floating side seats 2R, 2L, 3R, 3L. At the same time, the material selection in regard to the connection of side seats 2R, 2L, 3R, 3L to base seats 2M, 3M will be addressed.

FIG. 10-1 shows once more for clarification a three-seat bench S, which can be installed in the second or third row of seats 2, 3.

Three-seat bench S is shown in FIG. 10-2 in a side view from the left. Right seat 2R, 3R, in which backrest 22M, 23M is already folded down onto seat part 2R, 3R, is in front. As a result, backrest 22M, 23M of base seat 2M, 3M is visible in the background. Because right seat 2R, 3R is arranged freely floating at base seat 2M, 3M, in FIG. 10-2 the side part of base seat 2M, 3M is also visible. The already described receiving elements 72-1M, 73-1M, which are provided for receiving adapter plate A of right seat 2R, 3R, project from said side part. Moreover, the face side of cross tube Q and seat feet 52M, 53M, projecting from the side part, are visible in the front and back area. Here, it is already evident that seat feet 52M, 53M have locking hooks, which enable fastening of base seat 2M, 3M in attachment points 103 of vehicle floor 102.

Backrest-side fitting 42M, 43M and the seat part-side fitting 32M, 33M, seat feet 52M, 53M, and receiving elements 72-1M, 73-1M, which lead off from reinforcement structure 72M, 73M within the side part of base seat 2M, 3M, are produced from a steel material. Adapter plate A is also produced from a steel material and is connected to the side part of base seat 2M, 3M via receiving elements 72-1M, 73-1M, projecting from the side part; two of these are preferably arranged above and two below. Adapter plate A has fastening elements A1 for this purpose.

FIG. 10-3 shows right seat 2R, 3R with the same reference characters in its easy-entry folded position II. Right seat 2R, 3R in the first fastening variant is pivoted forward in the x-direction via cross tube Q leading off in the y-direction from adapter plate A in the normal installation state in the direction of travel.

Before the pivoting can be carried out, a retaining device, comprising a retaining element H1 and a retaining element seat H2, must be unlocked. Said retaining device is shown in FIG. 10-4. As FIG. 10-3 shows, it is disposed in the back area of right side seat 2R, 3R.

FIG. 10-4 provides a perspective view, obliquely from the back, of the retaining device and adapter plate A and of cross tube Q leading off from adapter plate A. After the retaining device has been unlocked by a user, seat 2R, 3R can be pivoted into the easy-entry folded position II.

The retaining device is of particular advantage, because the seat part-side retaining element H1 has its own spring element on which a ring rests, whereby the spring element and ring sit on a bolt, which has a conical tip. During locking of right seat 2R, 3R, said conical tip engages in retaining element seat H2, which is disposed in a web A3 leading off laterally from adapter plate A. In this regard, the ring is moved against the bolt and the spring element is tensioned. The movement of the ring frees elements which in a groove of retaining element seat H2 result in the locking of right seat 2R, 3R. In the case of unlocking of right seat 2R, 3R, the locking in retaining element seat H2 is canceled and the spring element assures that the back area of right seat 2R, 3R rebounds and easily raised. A user senses and sees in an advantageous manner that the seat is released for carrying out the pivoting movement into the easy-entry folded position II.

FIG. 10-4 shows further the back top fastening element A1 and the back top locking element A2. It is shown in addition that right seat 2R, 3R is connected pivotably to cross tube Q via cross tube receiving member Q1.

FIG. 10-5 shows side seats 2R, 3R in a view from the front. The two cross tube receiving members Q1 are shown, whereby right cross tube receiving member Q1 has in addition a fixing element F1, which protrudes laterally in the y-direction coaxially to the axis of cross tube Q towards cross tube receiving member Q1. A fixing element receiving member F2 with a recess is located on cross tube Q. If right seat 2R, 3R is pivoted into the easy-entry folded position II, fixing element F1 also pivots and goes with a free end onto fixing element receiving member F2, until the end piece of the bolt, cylindrical in this exemplary embodiment, snaps into the recess of fixing element receiving member F2. The pivoting angle of the easy-entry folded position II can be set according to the arrangement of fixing element receiving member F2. FIG. 10-5 shows in addition that a buffer element P is disposed in the area of the conical transition from adapter plate A to cross tube Q. Said buffer element P has two contact surfaces with which a retaining part of the understructure of seat 2R, 3R comes into contact in the normal position and in the easy-entry folded position. As a result, when the end positions are reached, a hard stop of right seat 2R, 3R is avoided.

FIG. 10-6 shows in a view, obliquely from outside, of adapter plate A that, for example, four (two above, two below) fastening elements A1 and two locking elements A2 are disposed in adapter plate A. Fastening element A1 lying above and in back and locking element A2 are not visible. They lie on adapter plate A behind retaining device H1, H2. Fastening elements A1 and locking elements A2 serve to fasten right seat 2R, 3R to the side part of base seat 2M, 3M, as shown in FIG. 10-7.

FIG. 10-7 shows in three sequences, in each case a top and bottom illustration, right seat 2R, 3R in perspective illustrations obliquely from the front.

In the two left illustrations, right seat 2M, 3M is not yet unlocked. In the two middle illustrations, right seat 2M, 3M is already unlocked and is being raised. In the two right illustrations, right seat 2M, 3M is lifted out of receiving element 72-1M, 73-1M; i.e., adapter plate A of right seat 2M, 3M is separated from base seat 2M, 3M. The rectangular areas of the arrows shown in the three top illustrations are reproduced in the enlarged details of the three lower illustrations.

Receiving element 72-1M, 73-1M will be discussed first. Said receiving element is formed as a 90° angle and is attached with its spectacle-like side in the x-direction to the side part of base seat 2M, 3M. In the angled area leading off from this, in each case a top and bottom receiving hook 72-13, 73-13 is disposed, in which the bolt-like fastening elements A1, running in the x-direction, engage. In the angled area, moreover, an opening 72-12, 73-12 is arranged in which locking element A2 engages. The three bottom illustrations show only the top front receiving element 72-1M, 73-1M. In the back top area, there is an analogously made receiving element, whereby a receiving element, which has at least one receiving hook, is disposed in the front and back in the bottom area. There is a spring element receiving member 72-11, 73-11 in the corner of the two angled areas of the two top receiving elements 72-1M, 73-1M, whereby receiving hooks 72-13, 73-13 have a functional connection with a spring element in spring element receiving member 72-11, 73-11. This arrangement has the following important advantage.

First, the seat is still locked according to the two left illustrations. In the locking of seat 2R, 3R, bolt-like fastening elements A1 are hooked into receiving hooks 72-13, 73-13. Then, right seat 2R, 3R is pressed downward in the z-direction, as a result of which the front and back fastening element A2 snaps into opening 72-12, 73-12. Right seat 2R, 3R is locked to base seat 2M, 3M. In this movement in the z-direction, at least the front and back top receiving hooks 72-13, 73-13 are moved downward and the spring element is tensioned in the spring element receiving member 72-11, 73-11.

This function is utilized advantageously during the unlocking of right seat 2R, 3R. In the bottom left illustration, an unlocking element E is shown, which is used to unlock right seat 2R, 3R, and ensures that locking element A2 is brought out of openings 72-12, 73-12. The direction of movement of unlocking element E is shown by an arrow and occurs preferably in the x-direction. Other directions of movement are also conceivable. After the release of the locking of right seat 2R, 3R, the tensioning force of the spring element in spring element receiving member 72-11, 73-11 ensures that at least the two top receiving hooks 72-13, 73-13 lift right seat 2R, 3R upward relative to base seat 2M, 3M in the z-direction. For the user it is again visible optically and also perceptible that right seat 2R, 3R is decoupled and is ready to be removed from base seat 2M, 3M. The right bottom illustration shows that front fastening elements A1 and front unlocking element A2 have been taken out of receiving elements 72-1M, 73-1M.

Figures 3, 4, 5, 6, 7, 8, 9, 10, 11:
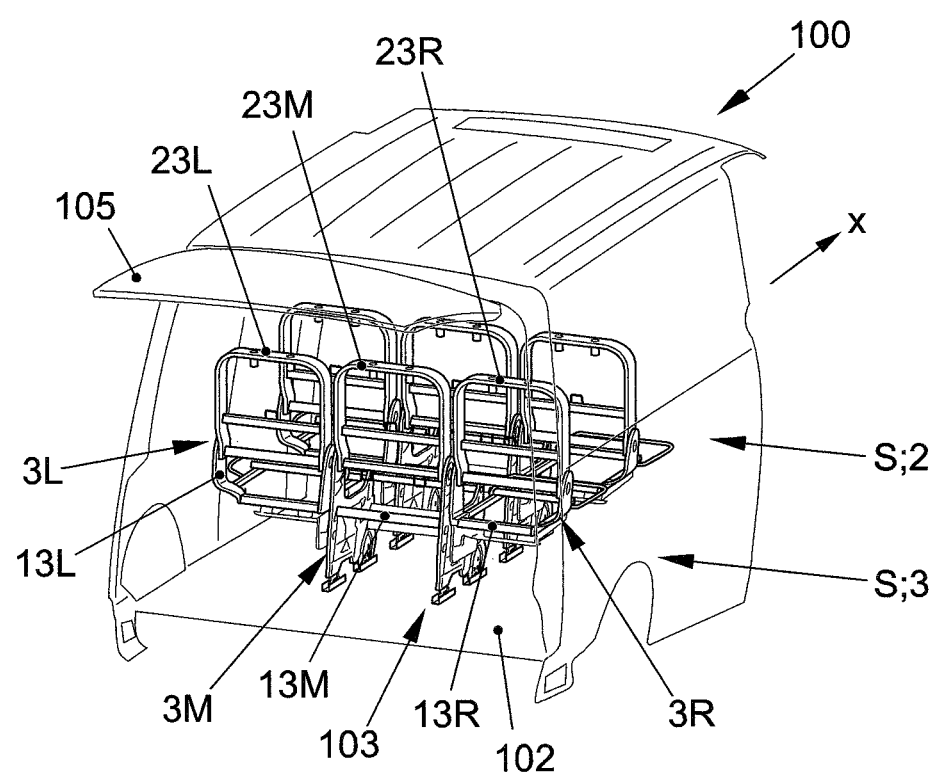

FIG. 11-1 once again shows in a perspective view obliquely from the front for clarification a three-seat bench S, which can be installed in the second or third row of seats 2, 3. FIG. 11-1 already shows that a frame R is disposed between right seat 2R, 3R and base seat 2M, 3M.

The decoupling of left seat 2L, 3L is shown in FIG. 11-2 in a left illustration in a perspective view from the right obliquely from the front. The two right illustrations aid in the description. The top right illustration shows base seat 2M, 3M and left seat part 2L, 3L in the area of its seat parts 12M, 13M and 12L, 13L from the front. A joint arrangement G with a top and bottom joint is made between the two seat parts 2L, 3L. The shown left side seat 2L, 3L can be pivoted hinge-like on a z-axis in the y-direction via the two joints. A retaining device, which is not visible in this top right illustration, with a retaining element H1, which engages in a retaining element seat H2, is disposed in the back area of left seat 2L, 3L. Retaining element seat H2 is located on the side part of base seat 2M, 3M, which is shown in the bottom right illustration obliquely from the back, so that retaining element seat H2 is visible. During locking of left seat 2L, 3L, retaining element H1 via the side part of base seat 2M, 3M engages in retaining element seat H2 of base seat 2M, 3M and fixes side seat 2L, 3L, shown by way of example, to middle base seat 2M, 3M. Retaining device H1, H2 can be of the type as was explained in regard to the easy-entry function in the description of FIG. 10-4.

The longitudinal axis of the retaining device then lies, however, in the y-direction transverse to the direction of travel x. As a result, the advantage is also achieved, here that after unlocking of left seat 2L, 3L, left seat 2L, 3L is pushed away slightly, so that the user can see and feel that left seat 2L, 3L is decoupled in the back area and is ready for removal. Via a, for example, bolt-like mounting, frame R and thereby left seat 2L, 3L can be removed from the bolts of the joint in the z-direction via the eyes arranged on it. Frame R, moreover, has horizontal rails, a top rail R1 and a bottom rail R2. The seat part structure of left seat 2L, 3L is configured so that the seat can be slid in the top and bottom rails R1, R2, as shown in FIG. 1-3, in the x-direction. After backrest 22L, 23L has been folded down relative to seat part 12L, 13L, left seat 2L, 3L can be slid in the x-direction into an easy-entry folded position II. In this respect, the same functionality in frame R is achieved with this second fastening variant of frame R over rails R1, R2 as in the first fastening variant with adapter plate A and the ability to pivot relative to cross tube Q.

With respect to the material selection, the procedure is analogous to what has been described for FIG. 9-2. The major difference, however, is that adapter plate A is not made of a steel material, but that joint arrangement G and frame R and rails R1, R2 is formed of steel material. The locking in retaining device H1, H2 and the adjacent parts such as, for example, the cross member of base seat 2M, 3M, which forms the retaining element seat H2, is also made of a steel material.

Figures 3, 4, 5, 6, 7, 8, 9, 10, 11, 12:
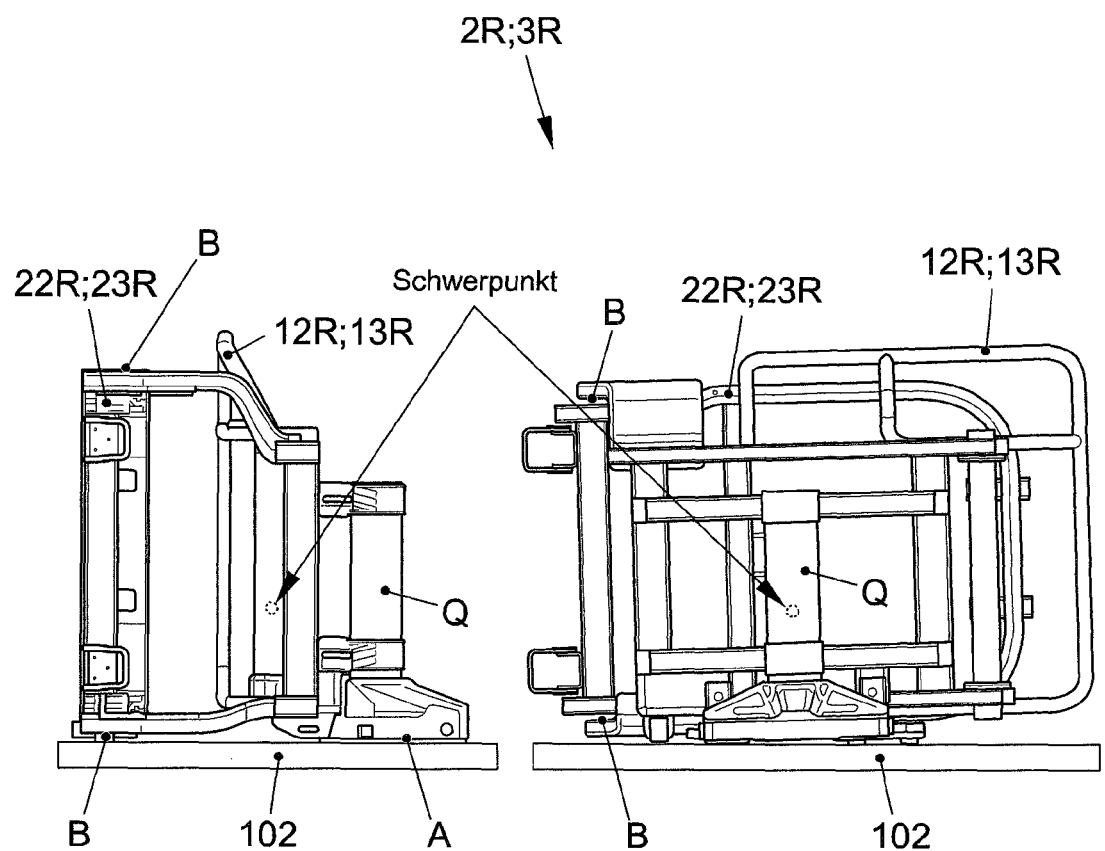
Figures 3, 4, 5, 6, 7, 8, 9, 10, 11, 12, 13:
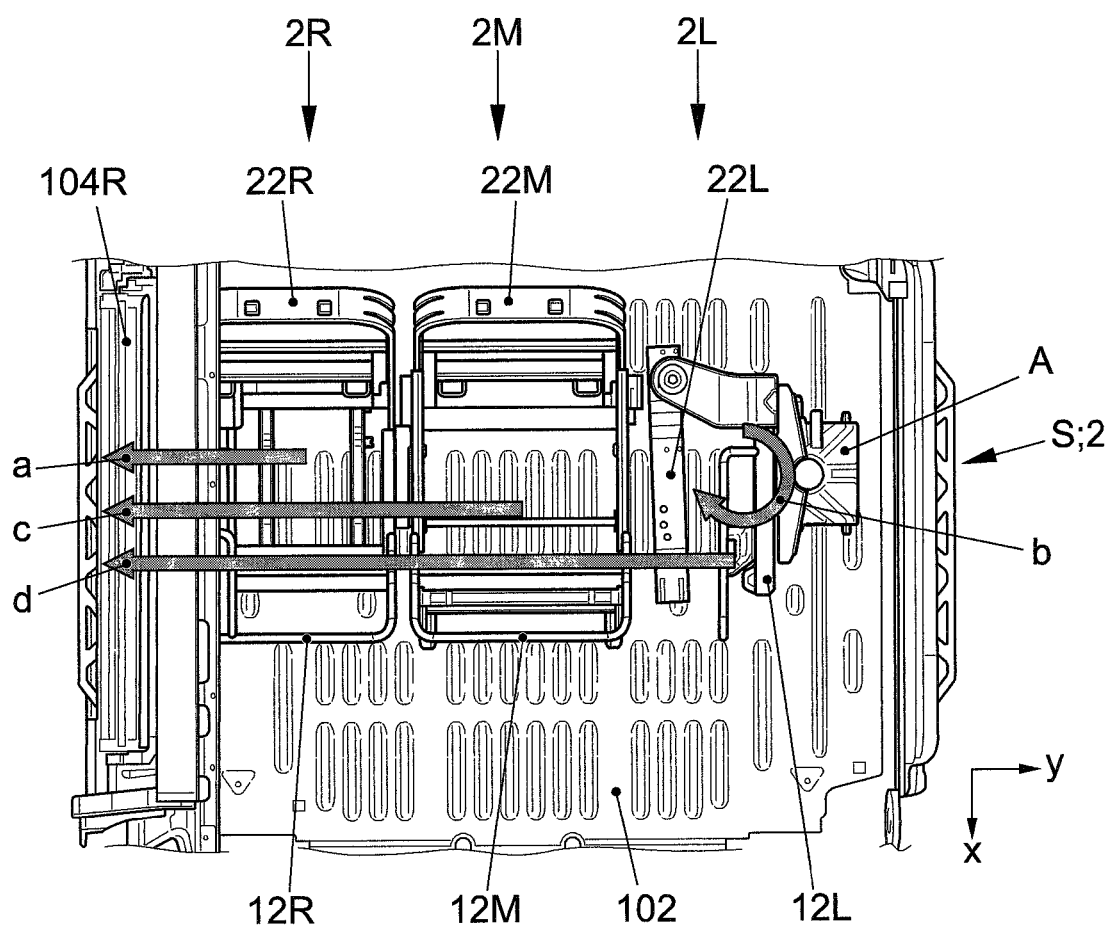
Figures 3, 4, 5, 6, 7, 8, 9, 10, 11, 12, 13, 14:
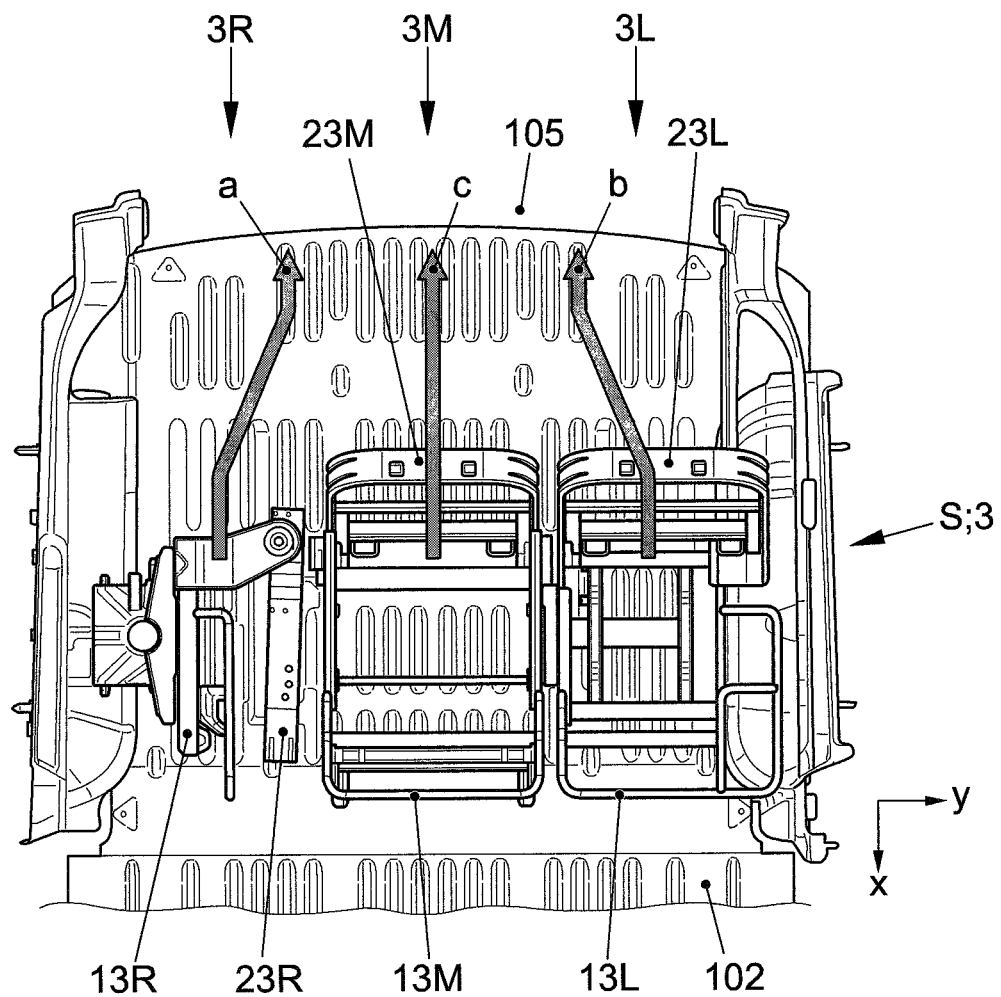
Figures 1, 4:
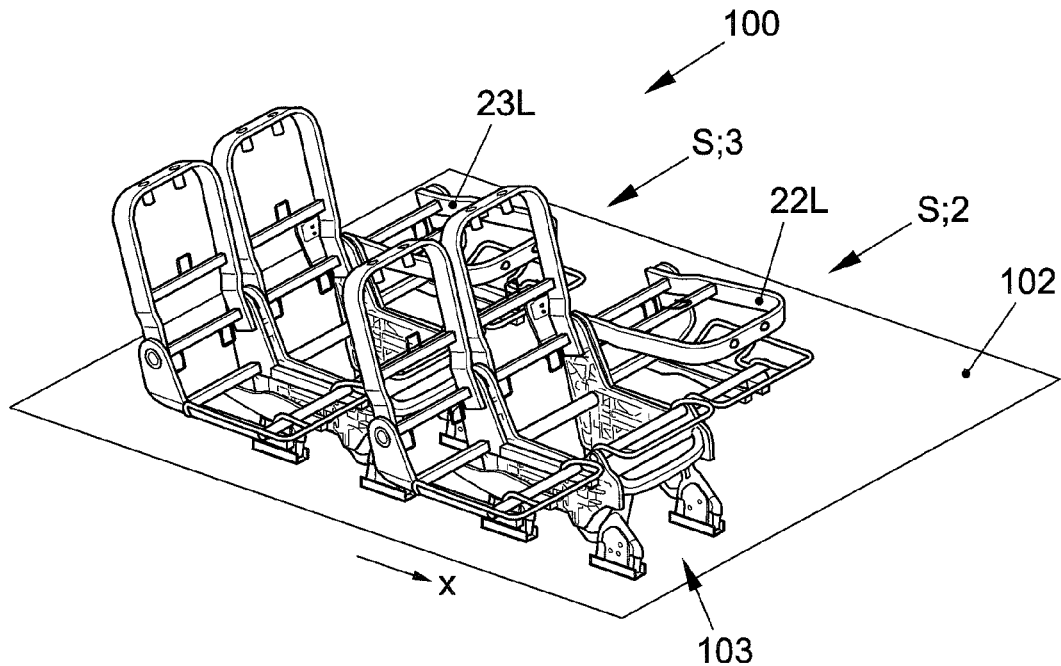
Figures 2, 4:
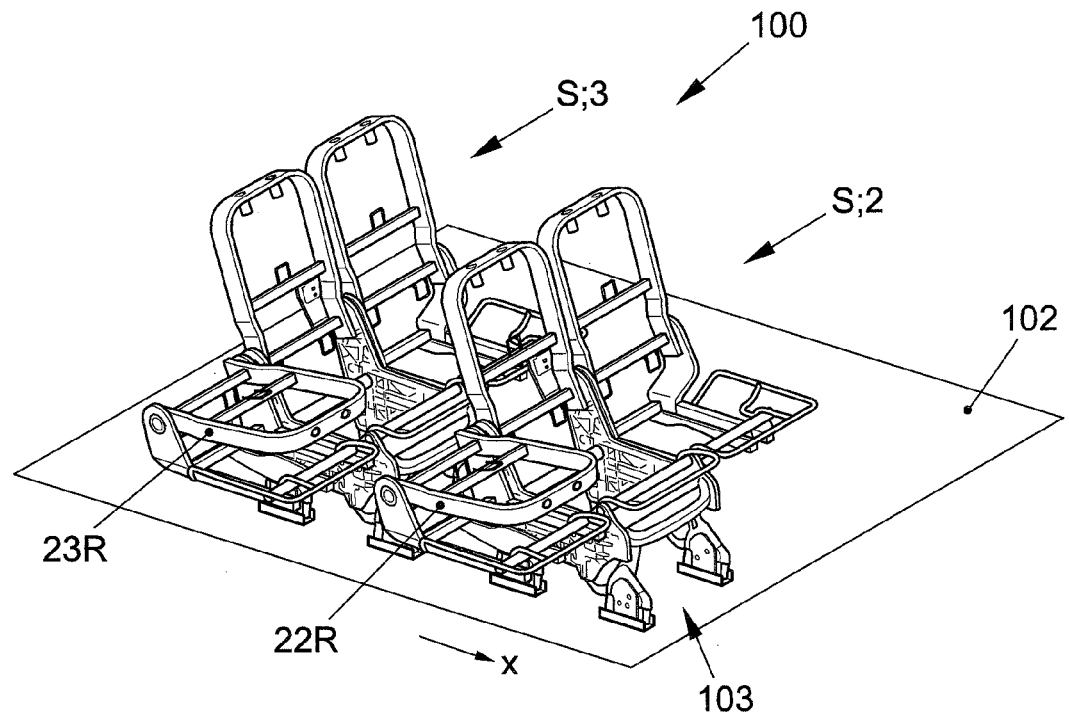
Figures 3, 4:
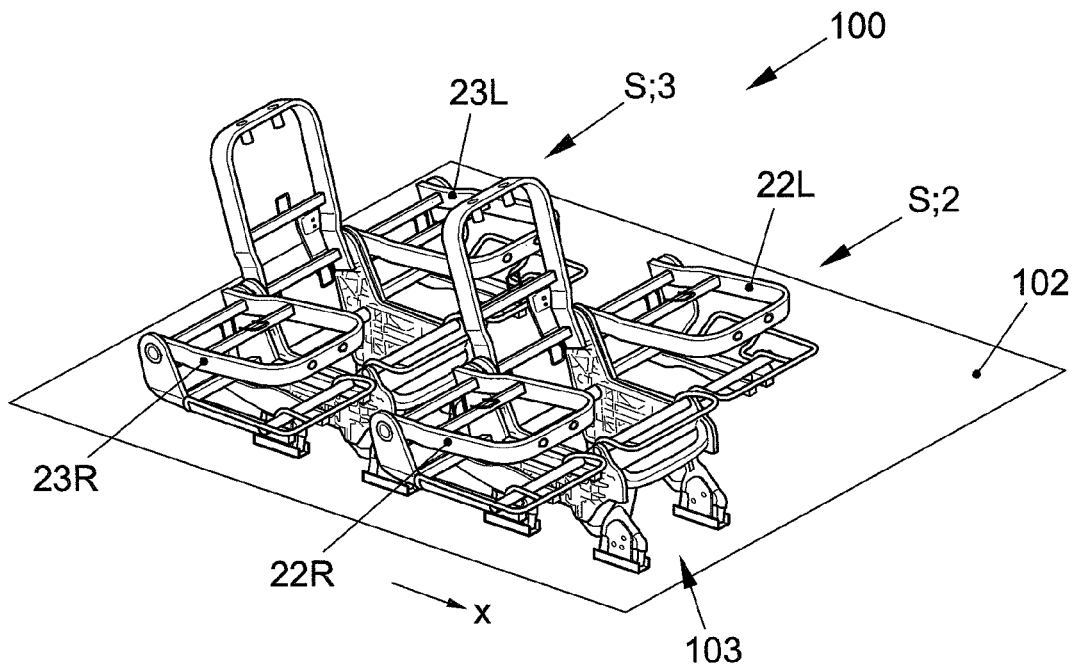
Figure 4:
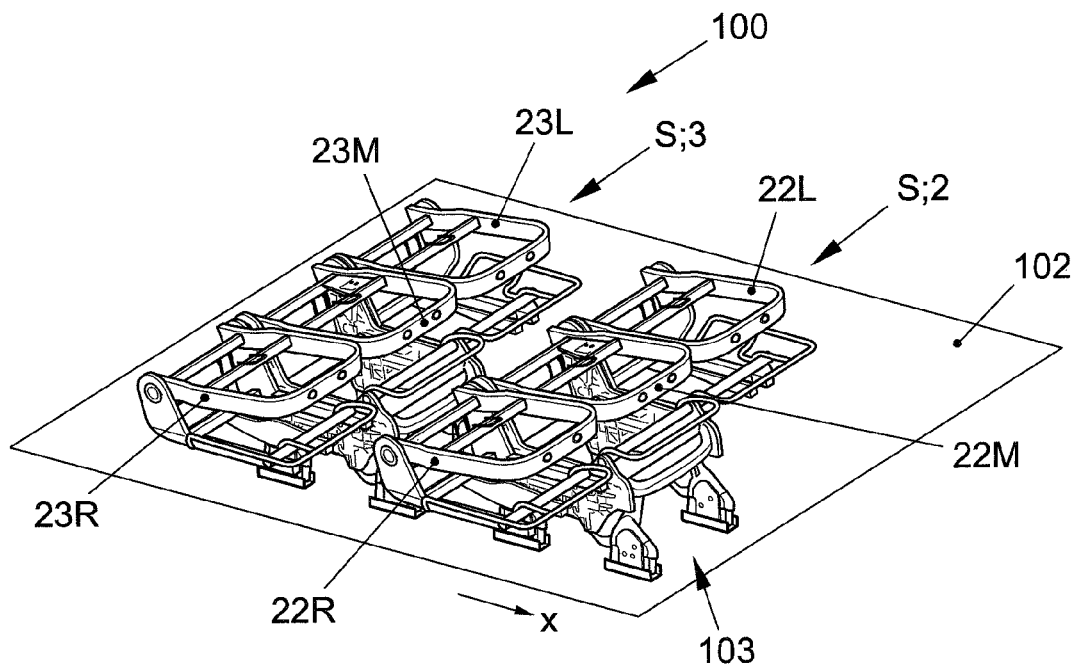
Figure 5:
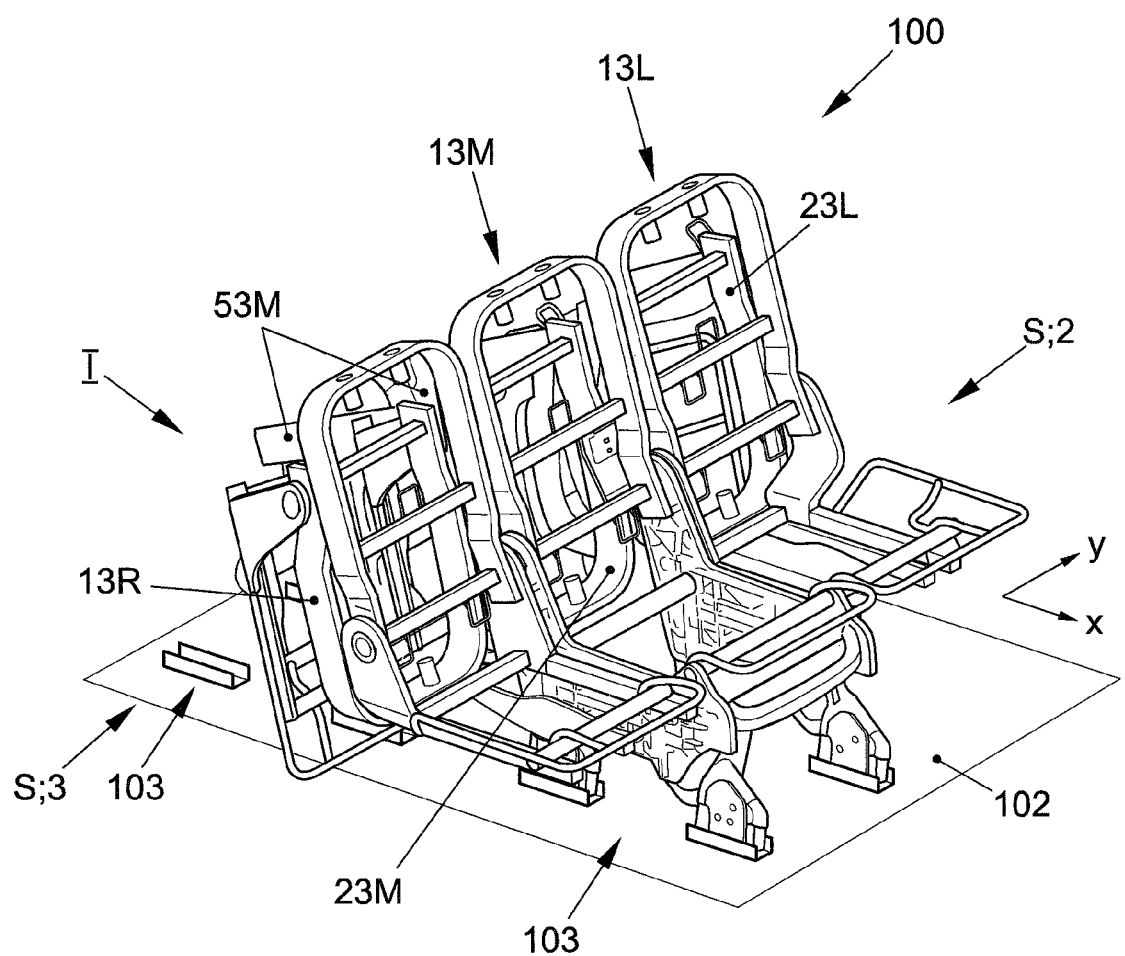
Figures 1, 6:
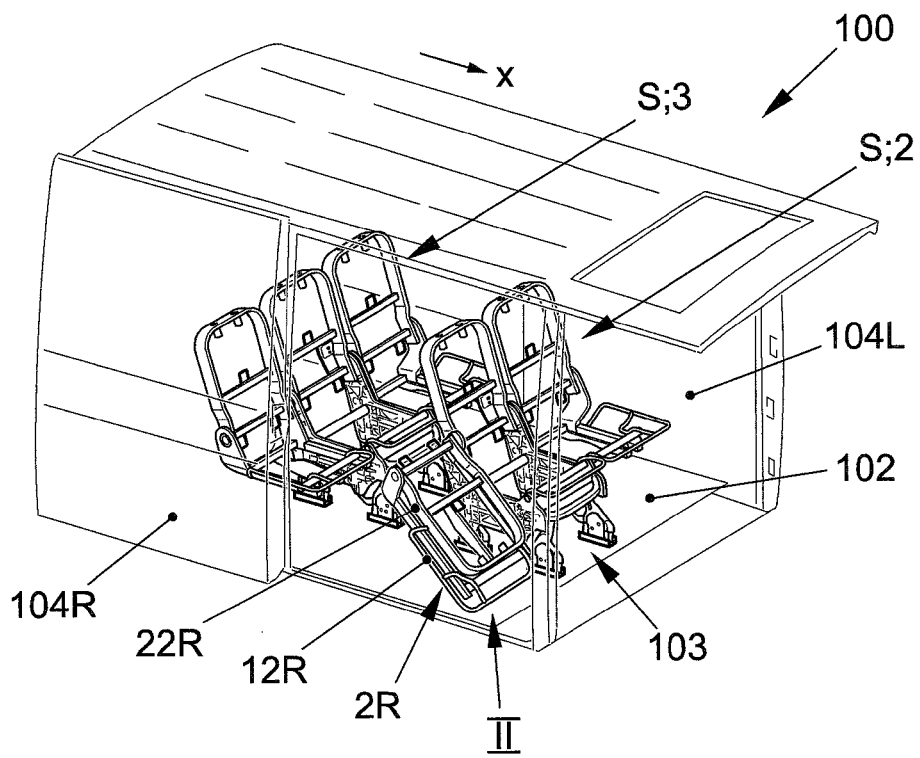
Figures 2, 6:
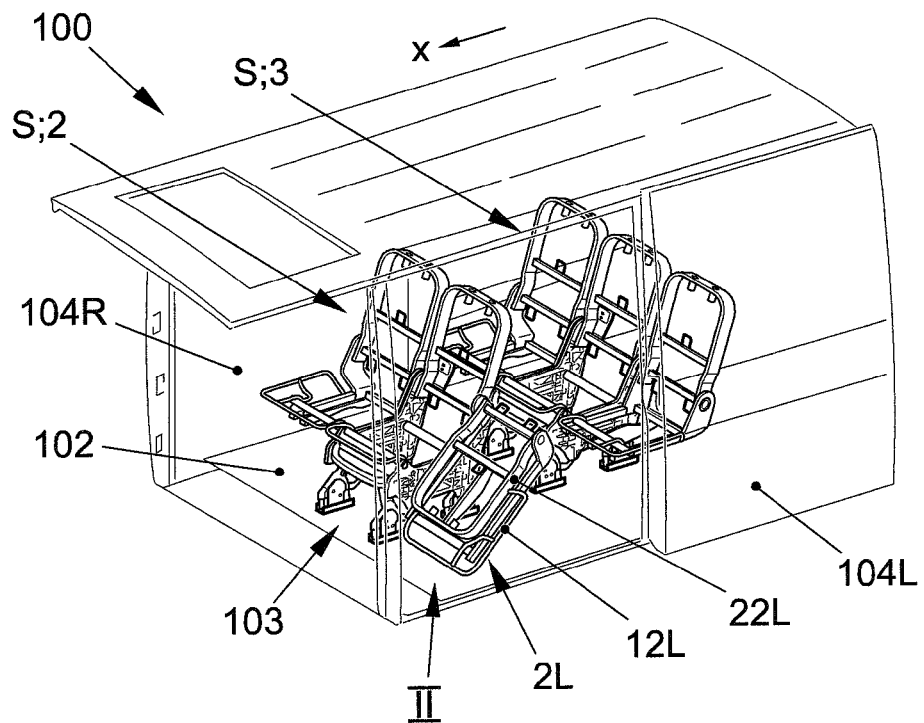
Figures 1, 7:
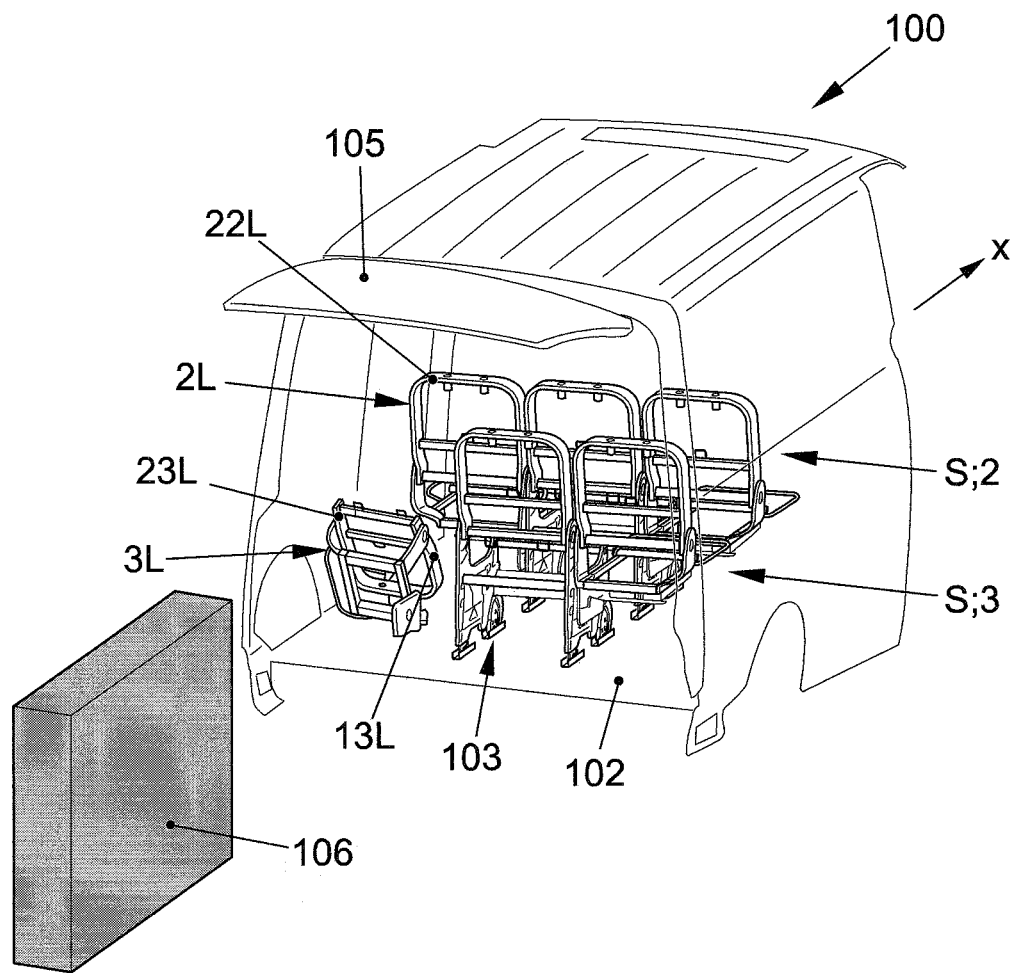
Figures 2, 7:
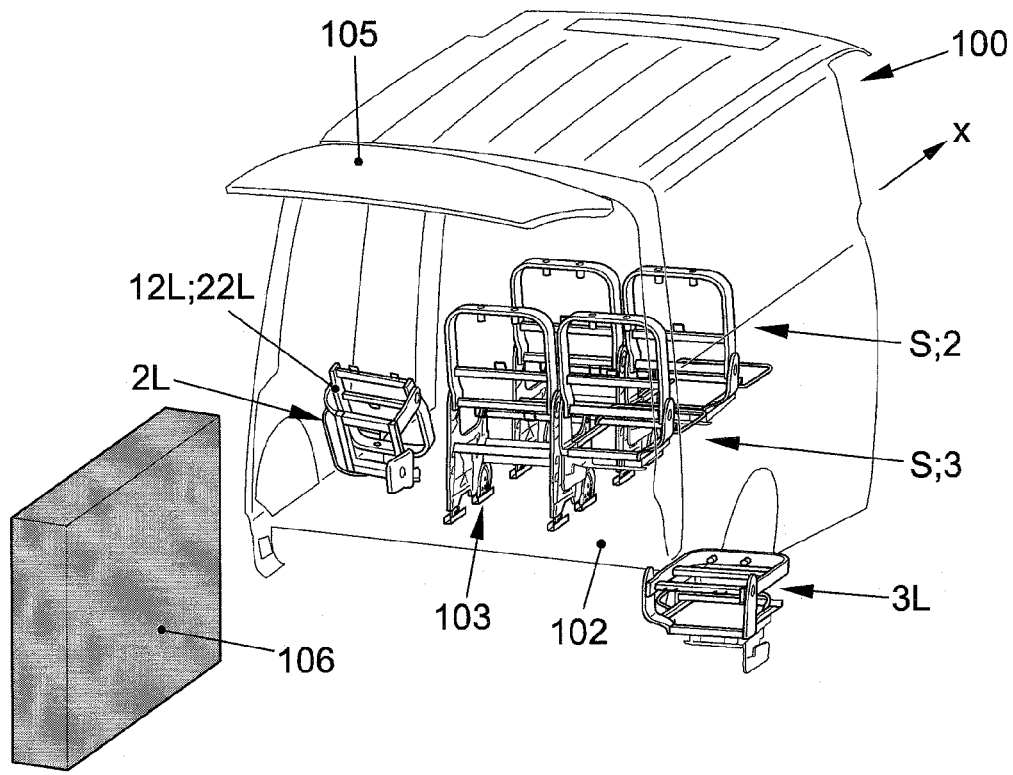
Figures 3, 7:
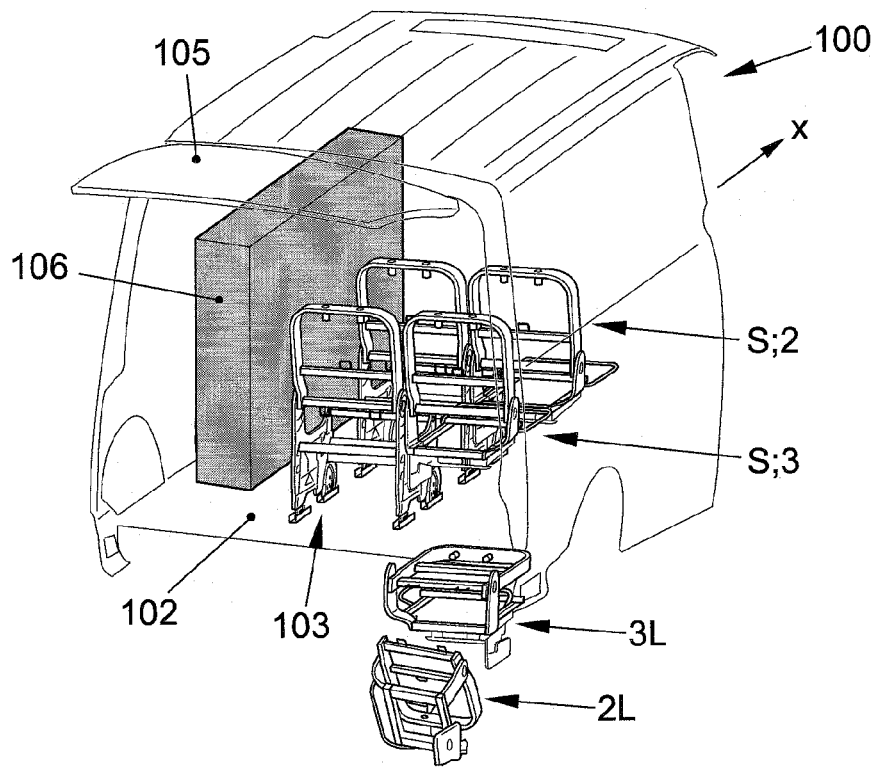
Figure 8:
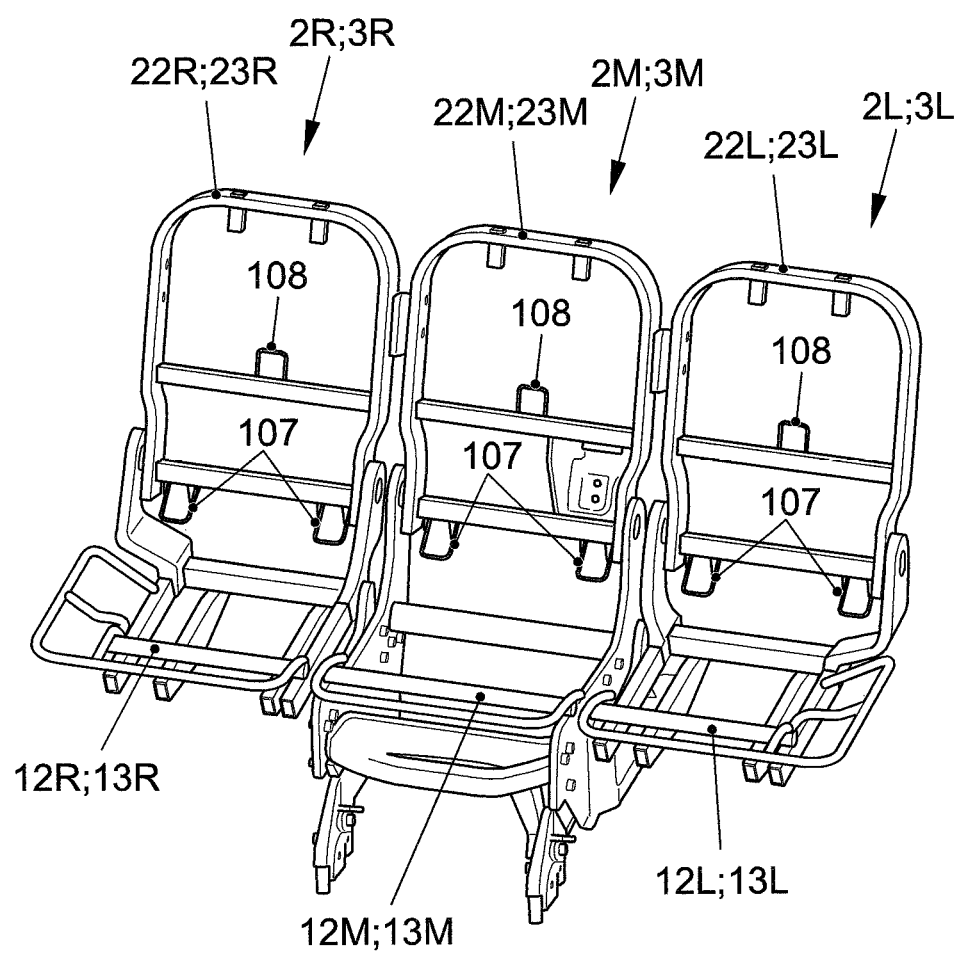
Figures 1, 9:
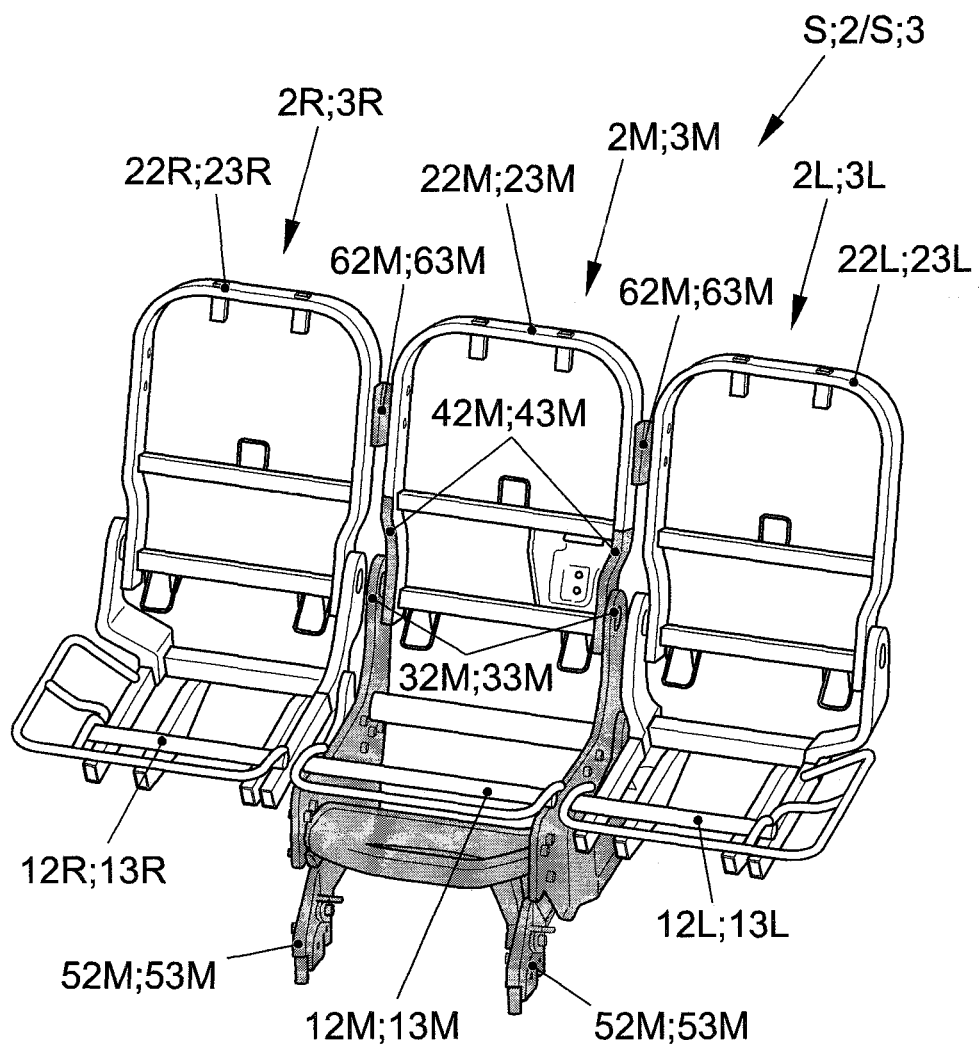
Figures 2, 9:
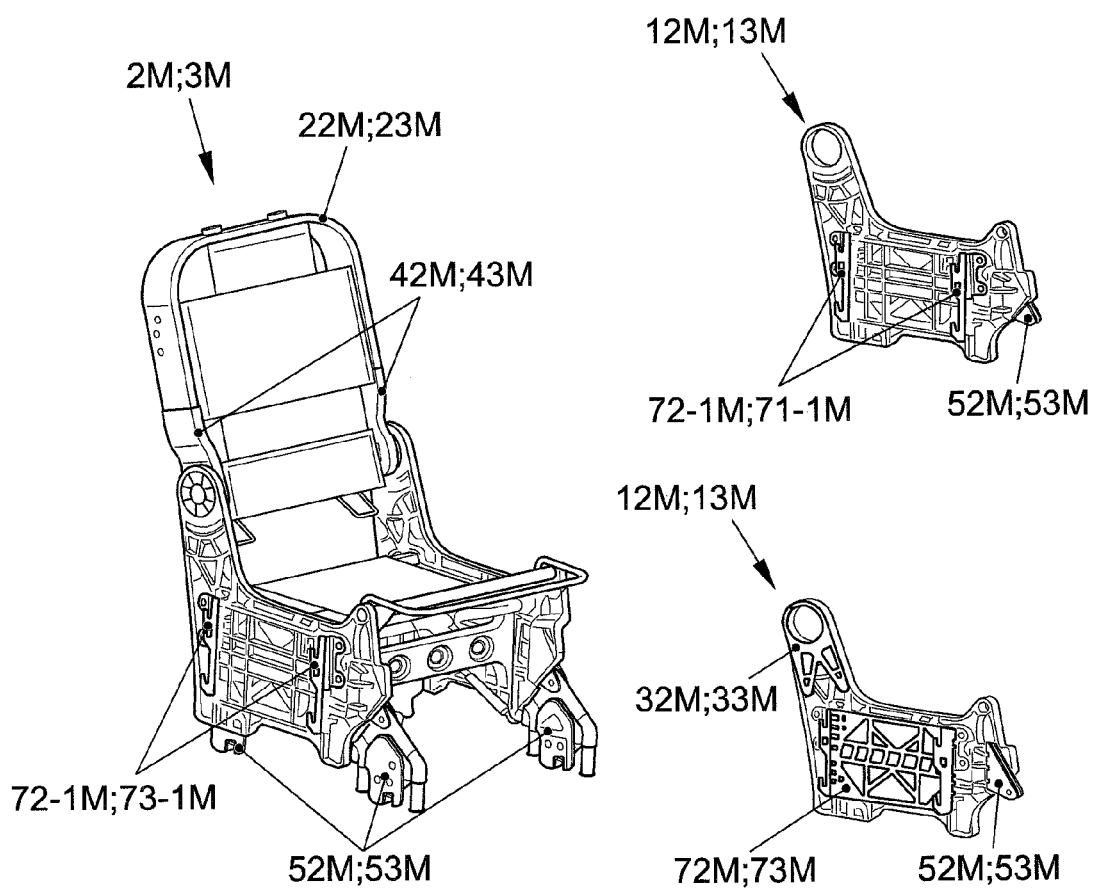
Figures 1, 10:
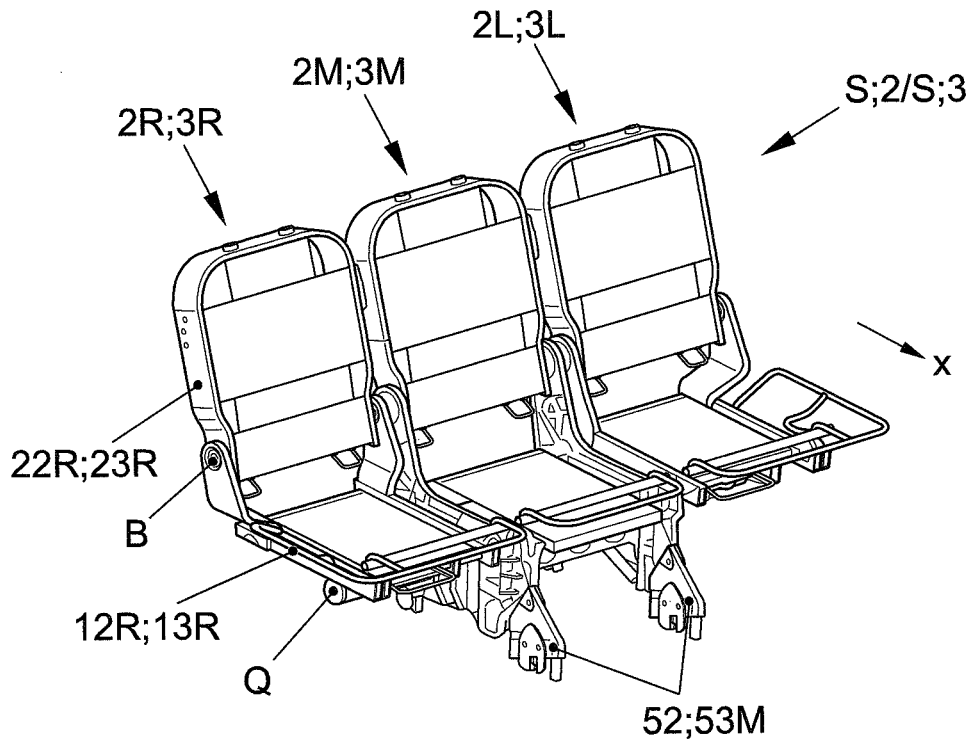
Figures 2, 10:
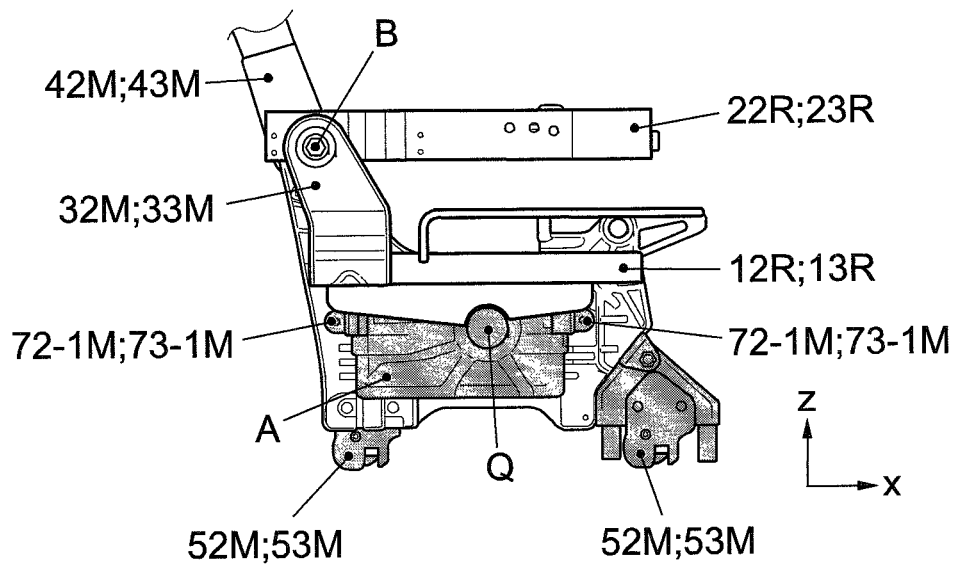
Figures 3, 10:
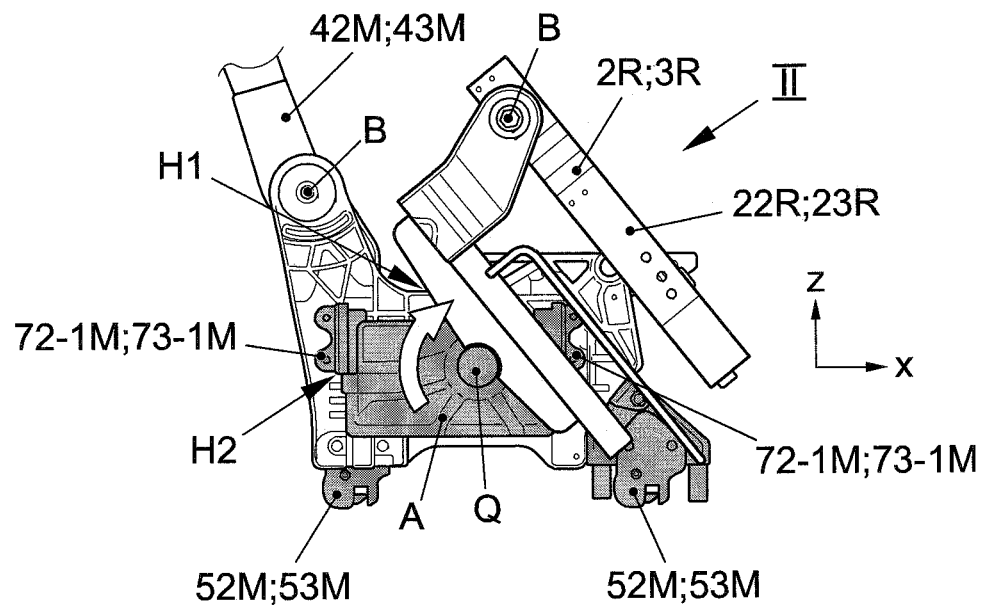
Figures 4, 10:
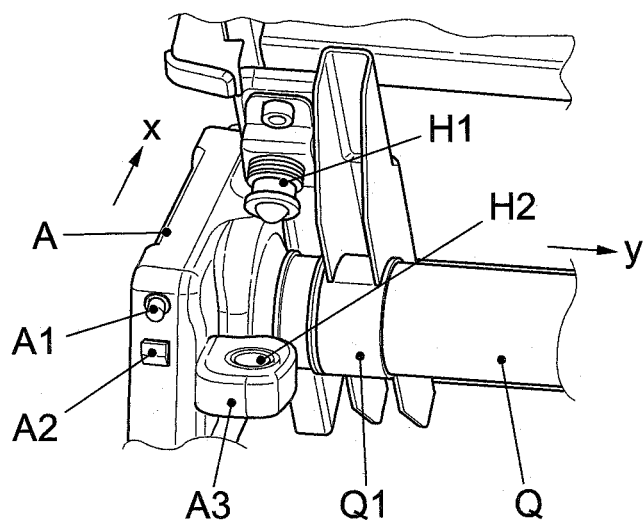
Figures 5, 10:
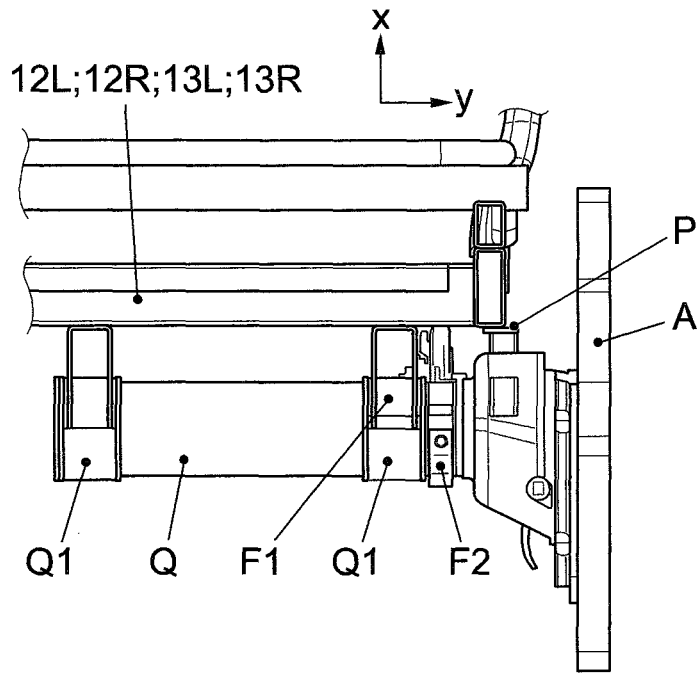
Figures 6, 10:
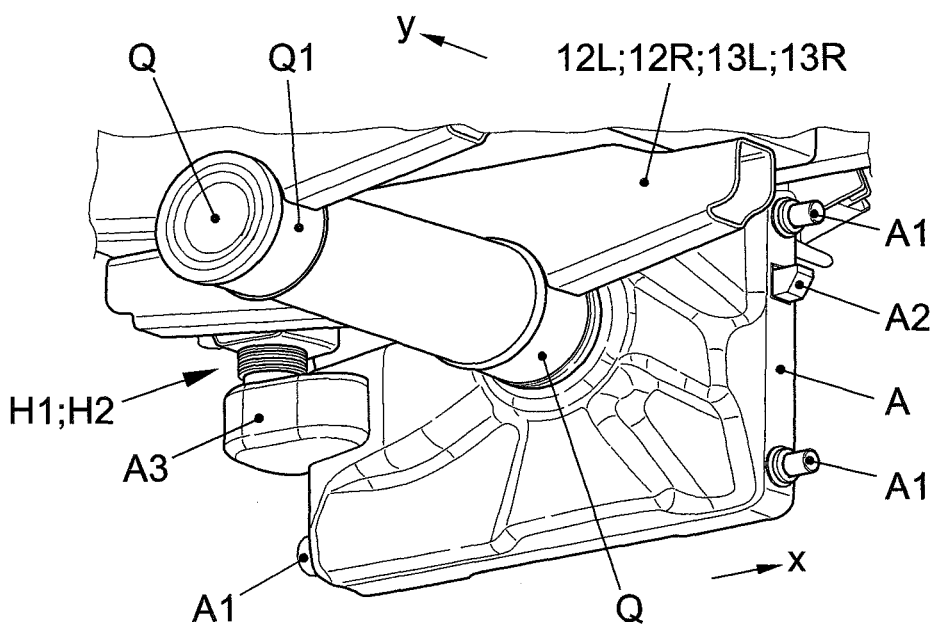
Figures 7, 10:
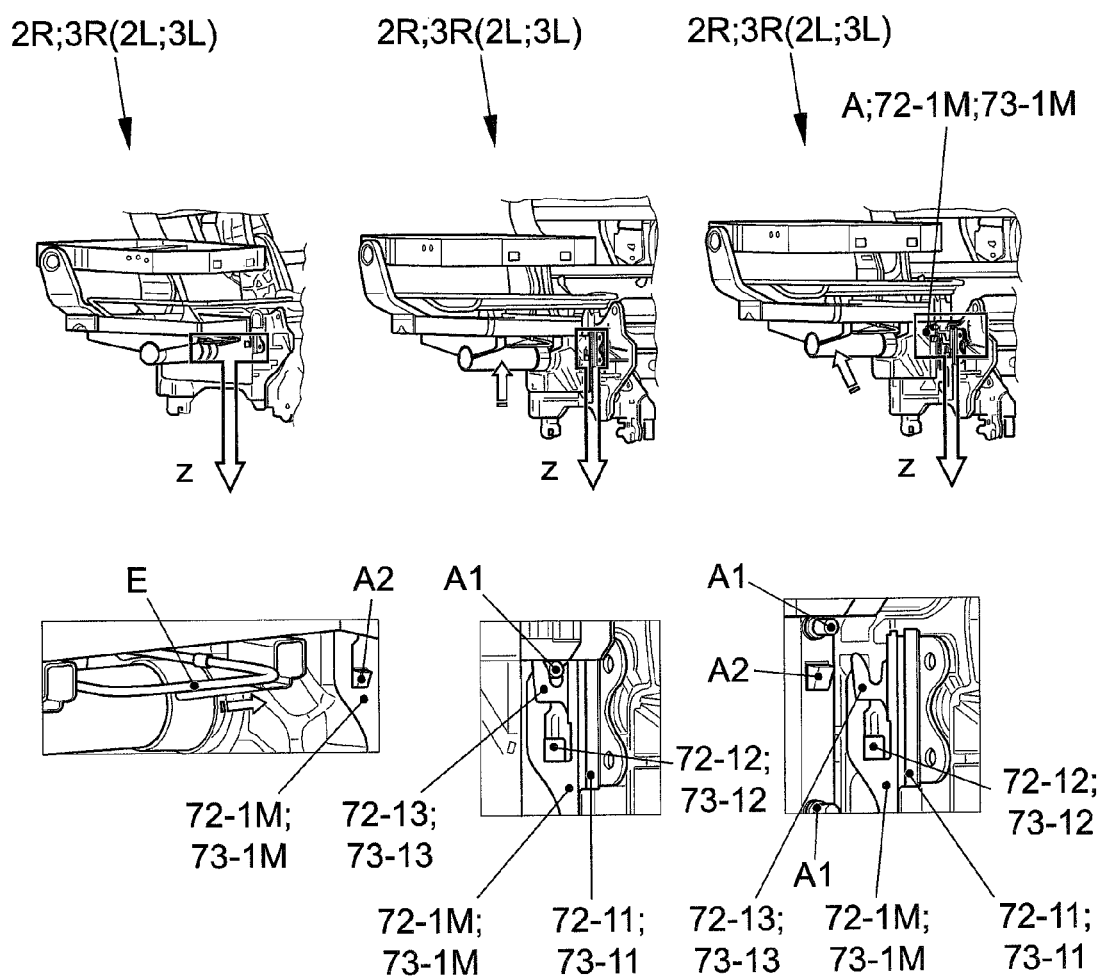
Figures 1, 11:
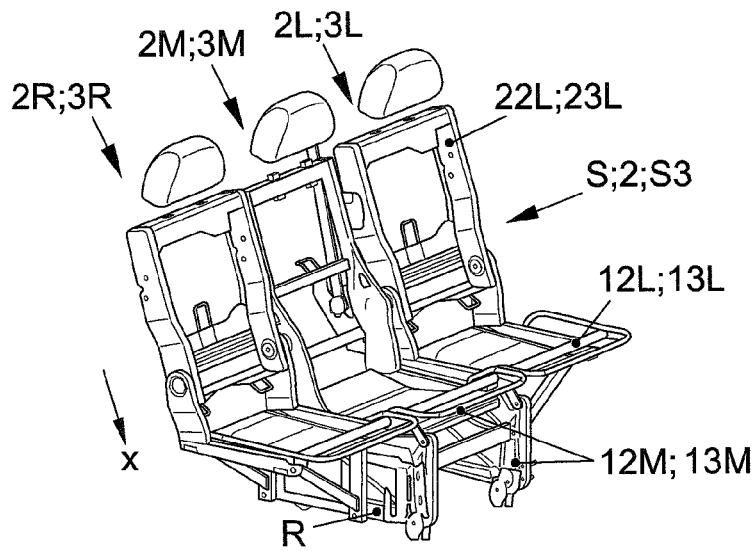
Figures 2, 11:
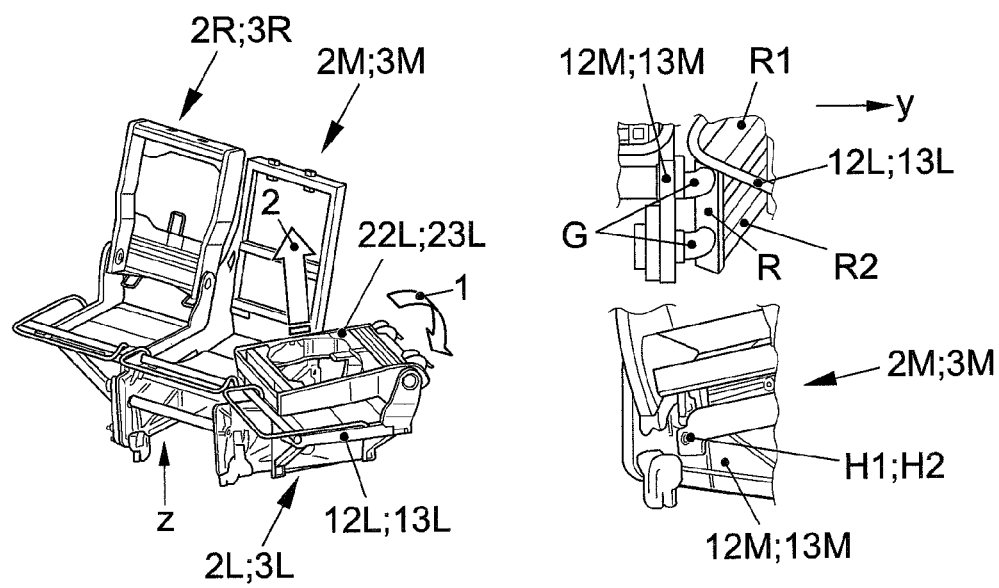
Figures 3, 11:
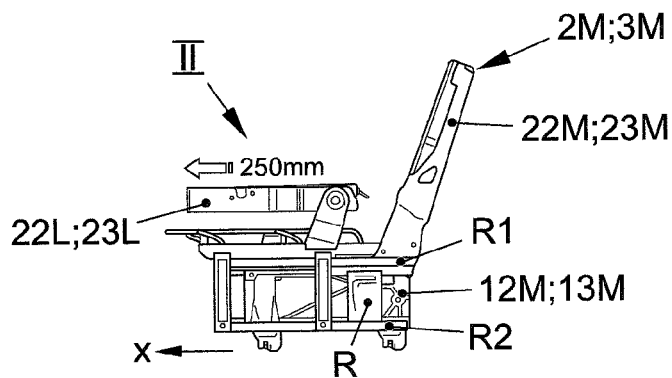
Figure 12:
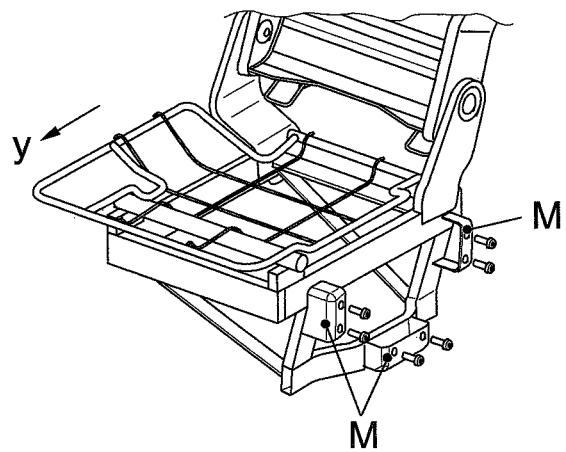
Figure 13:
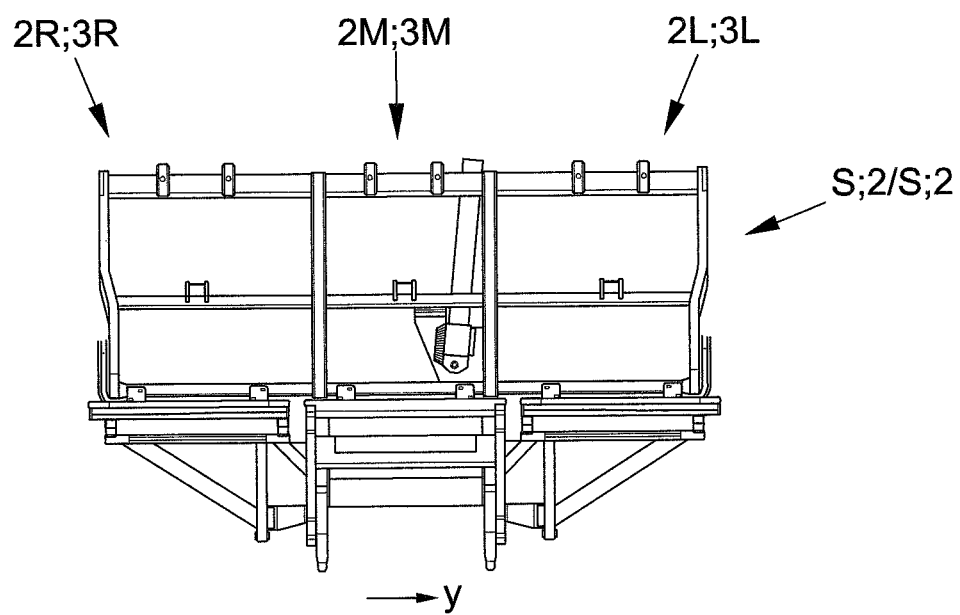
Figure 14:
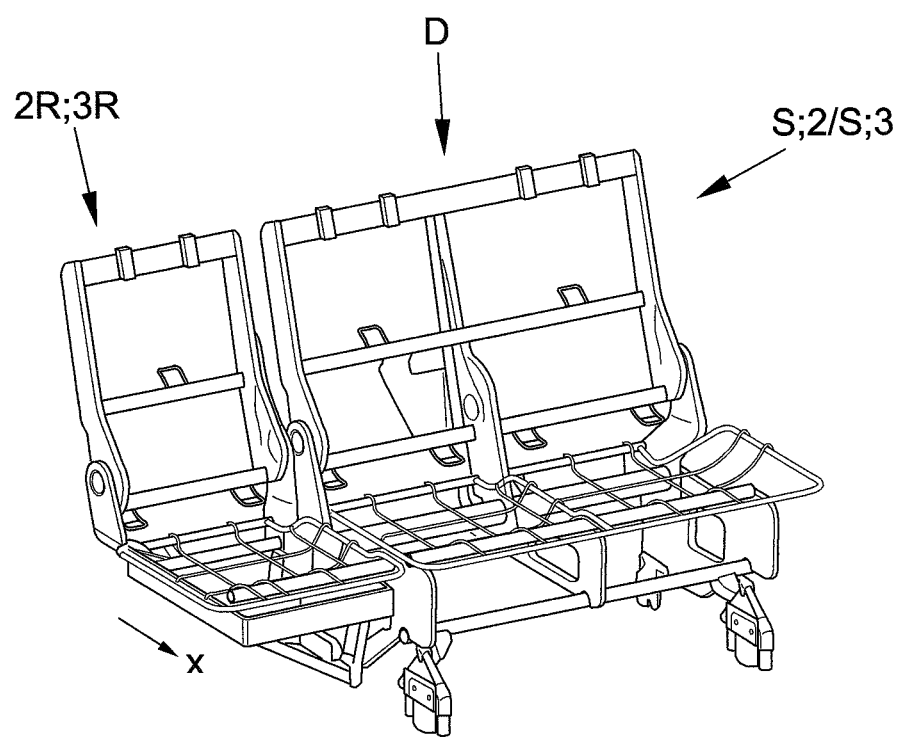
Figure 15:
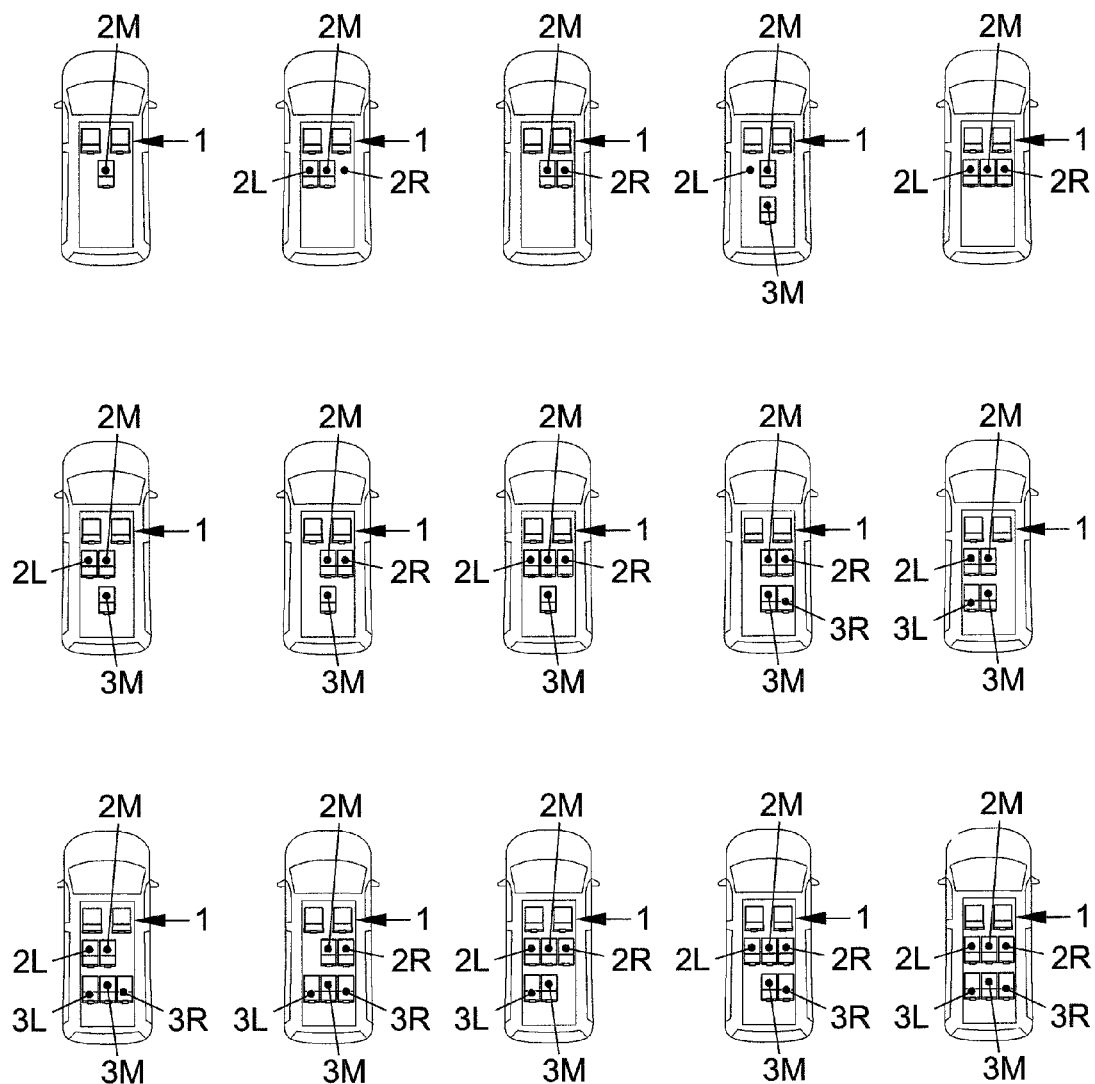
FIG. 15 illustrates possible seat variants.

A basic version with freely floating side seat parts 2R, 3R, 2L, 3L for a three-seat bench S in the second or third row of seats 2, 3 can be formed as depicted in FIG. 13, so that in each case modular screw connection M directed toward base seat 2M, 3M are provided. This more economically priced third fastening variant is also suitable for vehicles 100 in which removal of the side seats is necessary only rarely. The modular screw connections M are shown in FIG. 12.

It can be provided alternatively that the second or third row of seats 2, 3 or even the first row of seats 1 is made with a single seat 2R, 3R and a double seat bench D. Said double seat bench D has the same features as base seat 2M, 3M in the connection area to single seat 2R, 3R, which is disposed on the right in FIG. 14, but of course, can also be disposed on the left. It is understood that the attachment points can be arranged on vehicle floor 102 not as shown in FIG. 2, but must be arranged according to this configuration.

But this alternative configuration also enables the provision of six seating places in the second or third row of seats 2, 3 with only four or eight attachment points 103 in vehicle floor 102.

With consideration of the first row for the driver and front passenger, a maximum of nine seating places result together with the first and second row of seats behind them (total n=3), for which only twelve attachment points 103 on vehicle floor 102 must be provided.

In the long versions of some vehicles, even a further three rows of seats, thus a total of four (n=4) rows of seats, are arranged apart from the row for the driver and front passenger. In the case of a maximum number of three seats each, the vehicle is thus equipped with twelve seats, for which only sixteen attachment points 103 are necessary in vehicle floor 102 or in the body-side rails.

If two single seats are provided in the first row of seats 1, a plurality of seating arrangements result, whichever single seat 2L, 2M, 2R, 3L, 3M, 3R (without consideration of the alternative concept, FIG. 14) is arranged in the vehicle interior. It is understood that in the solution of the invention no left or right seat alone can be arranged in the vehicle interior.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat bench for a vehicle, the bench comprising:
   at least one locking unit; and
   at least two seats that are arranged next to one another and are connected to one another, the at least two seats acting as a base seat, which has the at least one locking unit for connection to a vehicle floor of a vehicle body, whereas the at least one other seat floats above a vehicle floor because the other seat is reversibly connected solely to the base seat.

2. The seat bench according to claim 1, wherein the connection between the base seat with at least one other seat occurs in that the base seat has at least one receiving element in which an adapter plate of the at least one other seat is fastened.

3. The seat bench according to claim 1, wherein the connection between the base seat with at least one other seat occurs in that the base seat has at least one joint arrangement to which at least one frame of the at least one other seat is fastened.

4. The seat bench according to claim 1, wherein the connection between the base seat with at least one other seat occurs in that a screw-type module is arranged between the base seat and the at least one other seat.

5. The seat bench according to claim 1, wherein, to form a two-seat bench, another seat is arranged beside the base seat, and wherein, to form a three-seat bench, two other seats are arranged and these are connected to the base seat in a floating manner.

6. The seat bench according to claim 1, wherein the base seat alone or the base seat and at least one of the other seats of the two-seat bench or the three-seat bench are adapted to be brought into a rolled-up position.

7. The seat bench according to claim 2, wherein at least one of the other seats of the two-seat bench or the three-seat bench are configured to be brought into an easy-entry folded position relative to the base seat.

8. A seat arrangement of a seat bench according to claim 1 in a vehicle body of a vehicle, wherein the vehicle floor has a maximum of four body-side attachment points for connecting the seat bench with up to three seat places in a row of seats, wherein the reversible connection of the seat bench to the vehicle floor is assured via the attachment points or attachment rails together with the locking unit of a base seat of the seat bench.

9. The seat arrangement according to claim 8, wherein the at least one other seat, solely connected to the base seat, is arranged floating over the vehicle floor.

10. A vehicle with a vehicle floor of a vehicle body, wherein the vehicle floor for mounting a seat bench independent of the number of seats forming a seat bench in a predeterminable number of rows of seats in each case has four floor-side attachment points or four attachment points in two floor-side attachment rails, so that the number of attachment points is always four times the number of rows of seats.

11. A seat bench for a vehicle, the seat bench comprising:
    a base seat configured to be fixed to a vehicle floor;
    at least one other seat arranged next to and connectable to the base seat; and
    at least one locking unit configured to secure the base seat to the vehicle floor,
    wherein the at least one other is connected solely to the base seat.

12. The seat bench according to claim 11, wherein the base seat is connectable to the vehicle floor at a plurality of attachment points.

13. The seat bench according to claim 11, wherein the base seat is connectable to the vehicle floor at four attachment points.

14. The seat bench according to claim 11, wherein the at least one other seat comprises a cross tube having an adapter plate at one end, and
    wherein said base seat comprises a receiving portion configured to receive the adapter plate.

15. The seat bench according to claim 11, wherein a center of gravity of the at least one other seat is formed centrally within the at least one other seat.

16. The seat bench according to claim 11, wherein the at least one other seat comprises a first side seat and a second side seat each formed on opposite sides of the base seat.

17. The seat bench according to claim 11, wherein the first side seat and the second side seat are connected solely to the base seat.

18. The seat bench according to claim 11, wherein the at least one other seat floats above the vehicle floor.

19. A vehicle, comprising:
    a vehicle floor; and
    a seat bench for a vehicle, the set bench comprising:
        a base seat, said base seat configured to be fixed to the vehicle floor;
        at least one other seat arranged next to and connectable to the base seat; and
        at least one locking unit configured to secure the base seat to the vehicle floor,
    wherein the at least one other is connected solely to the base seat.

* * * * *